US006628819B1

(12) United States Patent
Huang et al.

(10) Patent No.: US 6,628,819 B1
(45) Date of Patent: Sep. 30, 2003

(54) ESTIMATION OF 3-DIMENSIONAL SHAPE FROM IMAGE SEQUENCE

(75) Inventors: Yingjieh Huang, Kanagawa (JP); Hirobumi Nishida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/414,349

(22) Filed: Oct. 7, 1999

(30) Foreign Application Priority Data

Oct. 9, 1998 (JP) .......................................... 10-287876
Feb. 19, 1999 (JP) .......................................... 11-041321

(51) Int. Cl.$^7$ .............................................. G06T 17/00
(52) U.S. Cl. ...................................... 382/154; 345/419
(58) Field of Search .................................. 382/107, 154, 382/275, 285, 294, 309; 345/419; 348/43, 50

(56) References Cited

U.S. PATENT DOCUMENTS 5,309,522 A * 5/1994 Dye ............................ 382/41
6,009,437 A * 12/1999 Jacobs ......................... 707/102
6,157,677 A * 12/2000 Martens et al. ........ 375/240.16
6,252,974 B1 * 6/2001 Martens et al. ............. 382/107

FOREIGN PATENT DOCUMENTS

JP          10-31747 A      2/1998

OTHER PUBLICATIONS

Carlo Tomasi, et al. "Shape and Motion from Image Streams under Orthography: a Factorization Method", International Journal of Computer Vision, vol. 9, No. 2, 1992, pp. 137–154.

Conrad J. Poelman, et al. "A Paraperspective Factorization Method for Shape and Motion Recovery", IEEE Transactions on Pattern Analysis and Machine Intelligence, vol. 19, No. 3, Mar. 1997, pp. 206–218.

Ying–jieh Huang, et al. "Reconstruction of Measurement Matrices for Recovering Shape and Motion from Long Image Sequences", IAPR Workshop on Machine Vision Applications, Nov. 17–19, 1998, pp. 463–466.

* cited by examiner

*Primary Examiner*—Brian Werner
(74) *Attorney, Agent, or Firm*—Oblon, Spivak, McClelland, Maier & Neustadt, P.C.

(57) ABSTRACT

A method of obtaining a 3-dimensional shape of an object from a sequence of image frames includes the steps of a) generating a tracking matrix which has matrix elements representing coordinates of feature points of the object tracked through the sequence, and has each row representing a corresponding image frame and each column representing a corresponding feature point, wherein some of the matrix elements are missing, b) generating an estimation matrix as a sub-matrix of the tracking matrix by selecting rows and by selecting a column of a given feature point and columns of a predetermined number of feature points closest to the given feature point, such that the estimation matrix has matrix elements thereof missing only for the given feature point in a single image frame, c) calculating estimates of the missing matrix elements of the estimation matrix, d) repeating the steps b) and c) to obtain estimates of remaining missing matrix elements of the tracking matrix, and e) obtaining a 3-dimensional shape of the object from the tracking matrix having the missing matrix elements thereof estimated.

32 Claims, 21 Drawing Sheets

| NUMBER OF TRACKING SUB-MATRIXES | NUMBER OF SUB-MATRIX FEATURE POINTS | COMPUTATION TIME | |
|---|---|---|---|
| | | EXECUTION TIME (SECOND) | SINGULAR VALUE DECOMPOSITION (SECOND) |
| 1 | 1921(0) | 7674.32 | 7669.97(99.9%) |
| 2 | 1098(274) | 2413.19 | 2409.15(99.8%) |
| 3 | 769(192) | 1138.04 | 1134.69(99.7%) |
| 4 | 592(148) | 689.33 | 686.01(99.5%) |
| 5 | 481(120) | 482.07 | 478.80(99.3%) |
| 6 | 405(101) | 368.24 | 364.92(99.1%) |
| 7 | 350(84) | 330.49 | 327.35(99.0%) |
| 8 | 308(77) | 256.51 | 253.47(98.8%) |
| 9 | 275(68) | 222.23 | 219.27(98.7%) |
| 10 | 248(62) | 196.06 | 192.99(98.4%) |
| 11 | 227(56) | 180.86 | 177.73(98.3%) |
| 12 | 208(52) | 163.18 | 160.06(98.1%) |
| 13 | 193(48) | 152.20 | 148.82(97.8%) |
| 14 | 179(44) | 133.03 | 130.14(97.8%) |
| 15 | 168(42) | 123.11 | 120.19(97.6%) |
| 16 | 157(39) | 114.03 | 110.84(97.2%) |
| 17 | 148(37) | 107.68 | 104.70(97.2%) |
| 18 | 140(35) | 100.98 | 97.65(96.7%) |
| 19 | 133(33) | 95.90 | 92.91(96.9%) |
| 20 | 126(31) | 91.17 | 88.01(96.5%) |

ESTIMATION OF 3-DIMENSIONAL SHAPE FROM IMAGE SEQUENCE

BACKGROUND OF THE INVENTION

1. Field of the Invention

The present invention relates to a method which extracts a 3-dimensional shape of an object from a sequence of pictures such as moving pictures that are taken by use of a digital video camera or the like.

2. Description of the Related Art

One of the important research subjects in the field of computer vision is how to find a 3-dimensional shape of an object from moving pictures or a sequence of still pictures, which are taken by using a digital video camera, a digital still camera, or the like. This technology has utility in various application fields such as robot vision, automatic cruising vehicle, mechanic data entry via a video camera, image coding, 3-dimensional modeling, etc., and is an important topic of today in these application fields.

In order to extract 3-dimensional information from a sequence of 2-dimensional images, a scheme called Structure from Motion obtains an estimate of a shape from depth information, which is obtained from motion information. Namely, camera movement is obtained first, and, then, distances of object features from the camera center are obtained to generate an estimate of the object shape. Since feature points show very small positional shifts from one frame to another in moving pictures, however, it is almost impossible to identify the motion as either a parallel motion or a rotational motion. Because of this, solutions of the depth information may become infeasible solutions, resulting in unsuccessful reconstruction of shape information. When a time sequence is obtained at large sampling intervals, on the other hand, feature points show large movement between frames. In this case, however, reliability in feature point matching decreases.

In order to obtain stable solutions, Tomasi and Kanade presented a factorization method, which calculates motion and shape concurrently (C. Tomasi and T. Kanade, "Shape and motion from image stream under orthography: A factorization method," International Journal of Computer Vision, vol.9, 1992, pp. 137–254, the contents of which are hereby incorporated by reference). This method employs linear matrix representation based on a linear projection model, and uses singular value decomposition, which is robust against numerical errors. This method can obtain quite stable solutions, which is a feature contrasting this method from other schemes.

Further, Poelman and Kanade presented another factorization method based on a paraperspective projection model, which more closely approximates the perspective projection of an actual camera system than the linear projection model, and maintains linear-matrix formalization of the problem to be solved (C. J. Poelman and T. Kanade, "A paraperspective factorization method for shape and motion recovery," IEEE transaction on Pattern Analysis and Machine Intelligence, vol.19, no.3, pp.206–218, the contents of which are hereby incorporated by reference).

In the following, the paraperspective projection model and the factorization method based thereon will be described.

The paraperspective projection model takes into account both a scaling effect and a positioning effect of the perspective projection while maintaining benefits of linearity of the linear projection system. The scaling effect refers to the fact that the closer an object to a viewpoint, the larger the object appears. The positioning effect refers to the fact that an object positioned near an edge of a picture frame appears at a different angle from an object positioned near a projection center. According to the paraperspective projection model, a projection of an object onto an image plane is obtained through the following steps:

1) define an imaginary plane parallel to the image plane and including a center of gravity of the object;
2) obtain projections of object points onto the imaginary plane by tracing projections parallel to a line connecting between a camera center and the center of gravity; and
3) obtain projections of the object points from the imaginary plane onto the image plane via a perspective projection model.

FIG. 1 is an illustrative drawing for explaining the paraperspective projection model.

In FIG. 1, an image plane 2 is provided at a focal distance from a camera center 1. A center of gravity C is obtained with respect to a set of object feature points, pictures of which are taken by the camera. Some of the object feature points are shown in the figure as solid squares. An imaginary plane 3 is parallel to the image plane 2, and includes the center of gravity C. An origin of world coordinates is positioned at the center of gravity C, and 3-dimensional coordinates of a feature point p is represented by $s_p \in R^3$.

In an image frame f that is taken out of an image sequence, the camera center 1 has world coordinates $t_f$. Further, 2-dimensional local coordinates on the image plane 2 have base vectors $i_f, j_f \in R^3$ ($\|i_f\|=\|j_f\|=1$, $i_f \times j_f = 0$), and an optical axis of the camera is represented by a base vector $k_f = i_f \times j_f \in R^3$. In the image frame f, a 2-dimensional local coordinate system $\Sigma_f = (O_f; j_f, i_f)$ is defined, where an origin $O_f$ is an intersecting point between the vector $k_f$ and the image plane 2.

In the paraperspective projection model, a projection of the feature point p onto the image plane 2 is obtained through the following two steps, as previously described. At the first step, the feature point p is projected onto the imaginary plane 3. This projection is made in parallel to a line that passes through the camera center 1 and the center of gravity C. At the second step, the projection of the feature point on the imaginary plane 3 is further projected onto the image plane 2 via perspective projection. The projection of the feature point p onto the image plane 2 has coordinates $(u_{fp}, v_{fp})$ in the 2-dimensional local coordinate system $\Sigma_f = (O_f; i_f, j_f)$. Here, the focal distance of the camera is assumed to be 1. The coordinates $(u_{fp}, v_{fp})$ are represented as:

$$u_{fp} = m_f \cdot s_p + x_f$$
$$v_{fp} = n_f \cdot s_p + y_f \quad (1)$$

where $$z_f = (-t_f) \cdot k_f$$
$$x_f = (-t_f) \cdot i_f / z_f, \quad y_f = (-t_f) \cdot j_f / z_f \quad (2)$$
$$m_f = (i_f - x_f k_f)/z_f, \quad n_f = (j_f - y_f k_f)/z_f$$

Here, $z_f$ is a distance from the camera center 1 to the imaginary plane 3, and $(x_p, y_p)$ is a point where the projection of the center of gravity C is positioned on the image plane 2 via perspective projection. Further, coordinates $(U_{fp}, V_{fp})$, which represent the projection of the feature point p onto the image plane 2 as obtained directly through perspective projection, are represented as:

$$U_{fp}=i_f(s_p-t_f)/z_{fp}, V_{fp}=j_f(s_p-t_f)/z_{fp}$$

$$z_{fp}=k_f(s_p-t_f) \qquad (3)$$

When a Taylor expansion of the coordinates ($U_{fp}$, $V_{fp}$) around $z_f$ is taken into consideration, it can be seen that the paraperspective projection model is a first-order approximation of the perspective projection model under the assumption of:

$$|s_p|^2/z_f^2 \cong 0 \qquad (4)$$

In what follows, the factorization method will be described. In the factorization method, P feature points are tracked through F image frames. Then, the 2-dimensional local coordinates ($u_{fp}$, $v_{fp}$) of the P feature points (p=1, 2, ..., P) over the F frames (f=1, 2, ..., F) on the image plane 2 are obtained as a 2F x P matrix:

$$W = \begin{bmatrix} u_{11} & \cdots & u_{1P} \\ \vdots & u_{fp} & \vdots \\ u_{F1} & \cdots & u_{FP} \\ v_{11} & \cdots & v_{1P} \\ \vdots & v_{fp} & \vdots \\ v_{F1} & \cdots & v_{FP} \end{bmatrix} \qquad (5)$$

Hereinafter, the matrix W is referred to as a tracking matrix. An upper half of the tracking matrix represents x coordinates $u_{fp}$ of the feature points, and a lower half represents y coordinates $v_{fp}$ of the feature points. Each column of the tracking matrix shows coordinates of a single feature point tracked over the F frames, and each row of the tracking matrix represents x or y coordinates of all the feature points in a given frame.

Then, an average $x_f$ of x coordinates of all the feature points is obtained with respect to each frame, and an average $y_f$ of y coordinates is also obtained in the same manner.

$$\frac{1}{p}\sum_{p=1}^{P} u_{fp} = x_f, \quad \frac{1}{p}\sum_{p=1}^{P} v_{fp} = y_f \qquad (6)$$

The averages $x_f$ and $y_f$ are subtracted from each corresponding element of the tracking matrix. A resulting matrix W* is hereinafter referred to as a measurement matrix.

$$W^* = W - \begin{bmatrix} x_1 \\ \vdots \\ x_f \\ y_1 \\ \vdots \\ y_f \end{bmatrix} [1 \ \ldots \ 1] \qquad (7)$$

The measurement matrix is characterized by the number of levels that is three at most even when the number P of feature points and the number F of frames are increased. Thus, the measurement matrix can be decomposed as:

$$W^*_{(2F \times P)} = R_{(2F \times 3)} S_{(3 \times P)} \qquad (8)$$

A comparison of this equation with the equation (1) reveals that 2F-x-3 matrix R represents the camera's position vectors ($m_f$, $n_f$) (f=1, 2, ..., F), and that 3-x-P matrix S represents position vectors $s_p$ of feature points (p=1, 2, ..., P).

In general, the measurement matrix are not free from noises, which may make the number of levels of the matrix more than three. Even in such a case, as the matrix is decomposed through singular value decomposition such as to retain the three largest singular values, an optimum decomposition is guaranteed in terms of minimization of square errors. By the same token, a measurement matrix obtained via the paraperspective projection model can be decomposed into a camera position matrix and a feature-point shape matrix. Such decomposition of a measurement matrix is called "factorization".

In the following, a basic algorithm of factorization of a measurement matrix will be described. For the purpose of factorization, singular value decomposition of a matrix is utilized. By using singular value decomposition, the measurement matrix is decomposed into three matrixes as:

$$W^*_{(2F \times P)} = U_{(2F \times P)} \Sigma_{(P \times P)} V_{(P \times P)} \qquad (9)$$

Here, U is a 2F-x-P orthogonal matrix, and $\Sigma$ is a P-x-P diagonal matrix comprised of singular values ($\sigma_1$, $\sigma_2$, ..., $\sigma_P$) of the measurement matrix. Further, V is a P-x-P orthogonal matrix. If the number of levels of the measurement matrix is three, the singular values $\sigma_4$ and thereafter will be close to zero. Based on the assumption that the singular values $\sigma_4$ and thereafter are zero, the measurement matrix is decomposed as:

$$W^*_{(2F \times P)} = \hat{U}_{(2F \times 3)} \hat{\Sigma}_{(3 \times 3)} \hat{V}_{(3 \times P)} \qquad (10)$$

By using representations:

$$\hat{U} = \hat{R}, \ \hat{\Sigma}\hat{V} = \hat{S} \qquad (11)$$

the decomposition of the measurement matrix is written as:

$$W^* = \hat{R}\hat{S} \qquad (12)$$

Unfortunately, decomposition of the equation (12) is not unique. As a matter of fact, use of an arbitrary unitary matrix Q proves that an infinite number of solutions exist as follows.

$$W^* = \hat{R}\hat{S} = \hat{R}QQ^{-1}\hat{S} = (\hat{R}Q)(Q^{-1}\hat{S}) = \tilde{R}\tilde{S} = \tilde{W}^* \qquad (13)$$

In light of this, constraints as follows are introduced so as to find the matrix Q that satisfies these constrains.

$$\frac{\|m_f\|^2}{1+x_f^2} + \frac{\|n_f\|^2}{1+y_f^2} = \left(\frac{1}{z_f^2}\right) \qquad (14)$$

$$(f = 1, 2, \ldots, F)$$

$$m_f \cdot n_f = \frac{x_f y_f}{2}\left(\frac{\|m_f\|^2}{1+x_f^2} + \frac{\|n_f\|^2}{1+y_f^2}\right) \qquad (15)$$

$$(f = 1, 2, \ldots, F)$$

$$\|m_1\| = 1 \qquad (16)$$

Then, the matrix Q is used as:

$$R = \hat{R}Q, \ S = Q^{-1}\hat{S} \qquad (17)$$

to find a unique way to decompose the measurement matrix as follows.

$$\hat{W} = RS \qquad (18)$$

Here, the 2F-x-3 matrix R represents the camera's position, and the 3-x-P matrix S represents 3-dimensional coordinates of the feature points. A direction of the camera $(i_f, j_f, k_f)$ (f=1, 2, ..., F) is obtained from the matrix R (i.e., $(m_f, n_f)$: f=1, 2, ..., F) and the coordinates $(x_f, y_f)$ that are obtained from the equations (6). Further, $z_f$ is obtained from the equation (14), and the camera position $t_f$ is obtained from the equation (2).

Whether the linear projection model or the paraperspective projection model is used, the factorization method is based on the assumption that all the feature points are trackable through the entire image sequence. If some feature points found in the first frame are lost in subsequent frames, or new feature points are introduced halfway through the image sequence, this basis assumption is violated. When a camera rotates all around an object, for example, features appearing in the first frame are inevitably occluded in subsequent frames, so that the above assumption is not satisfied for a long sequence of object images. As a result, a tracking matrix tends to have many missing measurements (missing matrix elements), which need to be interpolated by estimates.

Further, the factorization method as described above have two different solutions, one corresponding to a convex shape and the other corresponding to a concave shape. Distinction between a convex shape and a concave shape, therefore, cannot be made.

Accordingly, there is a need for a method which can obtain a highly accurate 3-dimensional shape of an object from an image sequence even when a tracking matrix obtained from the sequence lacks some of the elements thereof.

Further, there is a need for a method which can efficiently estimate missing measurements of the tracking matrix.

Moreover, there is a need for a method which can determine a 3-dimensional shape of an object including a determination of whether a concave surface is observed or a convex surface is observed.

SUMMARY OF THE INVENTION

Accordingly, it is a general object of the present invention to provide a method which can satisfy the needs described above.

It is another and more specific object of the present invention to provide a method which can obtain a highly accurate 3-dimensional shape of an object from an image sequence even when a tracking matrix obtained from the sequence lacks some of the elements thereof.

In order to achieve the above objects according to the present invention, a method of obtaining a 3-dimensional shape of an object from a sequence of image frames includes the steps of a) generating a tracking matrix which has matrix elements representing coordinates of feature points of the object tracked through the sequence, and has each row representing a corresponding image frame and each column representing a corresponding feature point, wherein some of the matrix elements are missing, b) generating an estimation matrix as a sub-matrix of the tracking matrix by selecting rows and by selecting a column of a given feature point and columns of a predetermined number of feature points closest to the given feature point, such that the estimation matrix has matrix elements thereof missing only for the given feature point in a single image frame, c) calculating estimates of the missing matrix elements of the estimation matrix, d) repeating the steps b) and c) to obtain estimates of remaining missing matrix elements of the tracking matrix, and e) obtaining a 3-dimensional shape of the object from the tracking matrix having the missing matrix elements, thereof estimated.

In the method described above, the estimation matrix used for estimating the missing matrix elements is generated by selecting the feature points that are close to the feature point to be estimated. The feature points selected in such a manner insure conditions that are required for the paraperspective projection model to closely approximate the actual perspective projection system. This guarantees that obtained estimates of the missing matrix elements are highly accurate, which results in generation of an accurate object shape.

It is an other object of the present invention to provide a method which can efficiently estimate missing measurements of the tracking matrix.

In order to achieve the above object according to the present invention, the method as described above is such that the step c) includes repeating estimation of the missing matrix elements of the estimation matrix until the estimation is successful while size of the estimation matrix is increased at each attempt of the estimation of the missing matrix elements of the estimation matrix.

In the method described above, the estimation matrix generated for the estimation purpose has a size no greater than that which is necessary to obtain estimates, so that efficient estimation of the missing measurements is guaranteed.

It is still another object of the present invention to provide a method which can determine a 3-dimensional shape of an object including a determination of whether a concave surface is observed or a convex surface is observed.

In order to achieve the above object according to the present invention, the method as described above further includes the steps of generating the sequence of image frames by taking pictures of the object while the object rotates relative to a camera view, obtaining motion of the feature points from the tracking matrix having the missing matrix elements thereof estimated, and reversing a convex surface to a concave surface or reversing a concave surface to a convex surface with regard to said 3-dimensional shape of the object if the motion of the feature points is in a direction opposite to a rotational direction of the object.

In the method described above, confusion between convex surfaces and concave surfaces is resolved by comparing the estimated motion of the object with the actual motion of the object.

Other objects and further features of the present invention will be apparent from the following detailed description when read in conjunction with the accompanying drawings.

BRIEF DESCRIPTION OF THE DRAWINGS

FIG. 25 is a table showing data of experiments highlighting significance of reductions in computation time.

DESCRIPTION OF THE PREFERRED EMBODIMENTS

In the following, embodiments of the present invention will be described with reference to the accompanying drawings. These embodiments are directed to a 3-dimensional shape-extraction system which extracts a highly accurate 3-dimensional shape of an object from an image sequence by utilizing the factorization method when the image sequence is obtained as moving pictures or a sequence of still images by taking pictures of or videotaping the objects. It should be noted that the paraperspective projection model is used as a model of the camera system.

Figure 1:
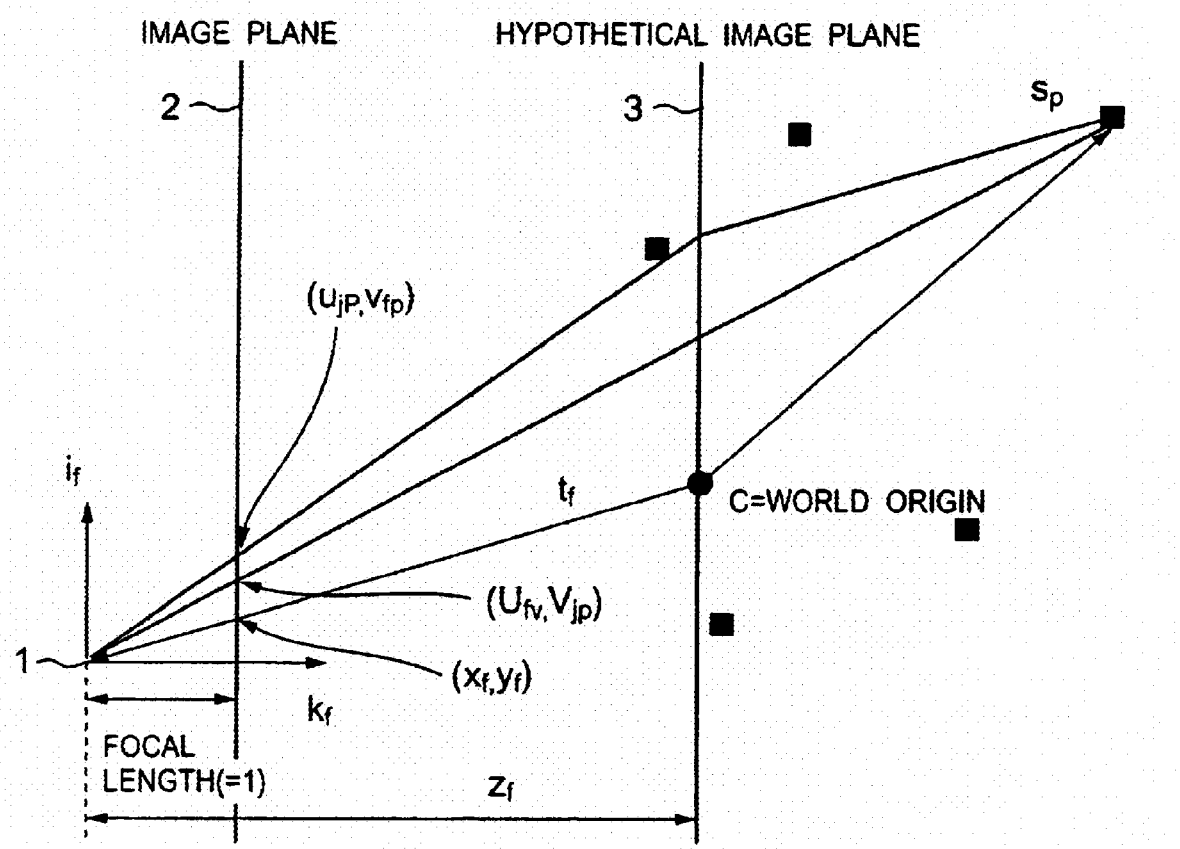
FIG. 1 is an illustrative drawing for explaining a paraperspective projection model.
Figure 2:
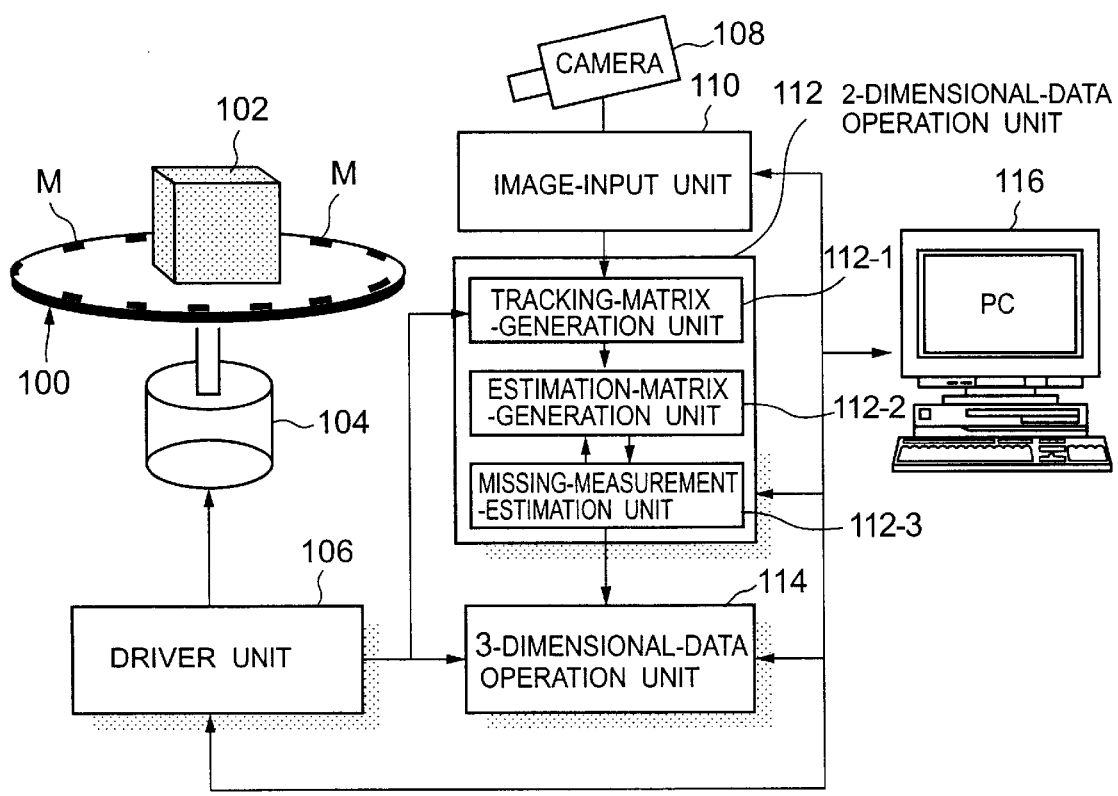
FIG. 2 is an illustrative drawing showing a configuration of a 3-dimensional shape-extraction system according to the present invention.

FIG. 2 is an illustrative drawing showing a configuration of a 3-dimensional shape-extraction system according to the present invention.

In FIG. 2, the 3-dimensional shape-extraction system includes a rotator base 100, a rotation drive mechanism 104, a driver unit 106, a digital-video camera 108, an image-input unit 110, a 2-dimensional-data operation unit 112, a 3-dimensional-data operation unit 114, a computer 116. The rotator base 100 carries an object 102 thereon. An upper surface of the rotator base 100 has its perimeter portion marked by a plurality of marks M arranged at predetermined intervals. The rotation drive mechanism 104 rotates the rotator base 100, and is driven by the driver unit 106. The digital-video camera 108 takes pictures of the object 102 on the rotator base 100 as the rotator base 100 rotates at a predetermined rate in a predetermined direction. The digital-video camera 108 generates an image stream. Here, the digital-video camera 108 is positioned in relation to the rotator base 100 such that the marks M of the rotator base 100 fall into the view of the digital-video camera 108.

The image stream from the digital-video camera 108 is processed by a processing system, which includes the image-input unit 110, the 2-dimensional-data operation unit 112, and the 3-dimensional-data operation unit 114, which operate in association with the computer 116. The image stream from the digital-video camera 108 is supplied to the image-input unit 110. The image-input unit 110 generates a set of still images from the image stream, and stores it in the memory of the computer 116.

The 2-dimensional-data operation unit 112 includes a tracking-matrix-generation unit 112-1, a estimation-matrix-generation unit 112-2, and a missing-measurement-estimation unit 112-3. The tracking-matrix-generation unit 112-1 generates a tracking matrix by detecting and tracking feature points from the image sequence stored in the memory of the computer 116. The estimation-matrix-generation unit 112-2 generates an estimation matrix as a sub-matrix of the tracking matrix such that the estimation matrix includes a missing measurement to be estimated. The missing-measurement-estimation unit 112-3 estimates the missing measurement in the estimation matrix at a time, and generates a measurement matrix by filling estimates in missing measurements of the tracking matrix. The measurement matrix is stored in the memory of the computer 116, and is subsequently subjected to factorization.

The 3-dimensional-data operation unit 114 extracts a 3-dimensional shape of the object from the measurement matrix, and stores the data of the 3-dimensional shape in the memory of the computer 116. Preferably, the computer 116 reproduces a view of the 3-dimensional shape from the data of the 3-dimensional shape, and displays the view on a display screen. This permits a visual check of the extracted shape.

The driver unit 106 outputs a rotation-direction data indicative of a rotation direction of the rotator base 100. The rotation-direction data is supplied to the 3-dimensional-data operation unit 114. When the 2-dimensional-data operation unit 112 needs the rotation-direction data for feature tracking, the rotation-direction data is also supplied to the 2-dimensional-data operation unit 112. The computer 116 has the memory as described above for storing intermediate data obtained during the process and final data obtained as a result of the process, and, also, controls operations of the driver unit 106 and the processing system (the image-input unit 110 the 2-dimensional-data operation unit 112, and the 3-dimensional-data operation unit 114). All or part of the image-input unit 110, the 2-dimensional-data operation unit 112, the 3-dimensional-data operation unit 114 may be implemented as software operating on the hardware resources of the computer 116.

The image-input unit 110 carries out the following process.

Figure 3:
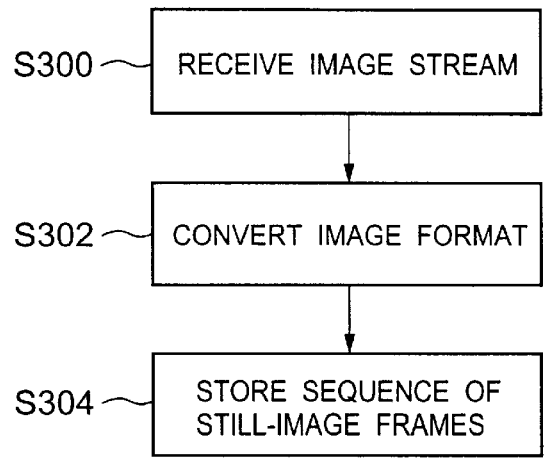
FIG. 3 is a flowchart showing a process performed by an image-input unit of FIG. 2.

FIG. 3 is a flowchart showing a process performed by the image-input unit 110.

At a step S300, the image-input unit 110 receives an image stream from the digital-video camera 108.

At a step S302, each frame of the received image stream is converted into an image of a proper still-image format.

At a step S304, a time sequence of the still-image frames is stored in the memory of the computer 116.

The 2-dimensional-data operation unit 112 carries out the following process.

Figure 4:
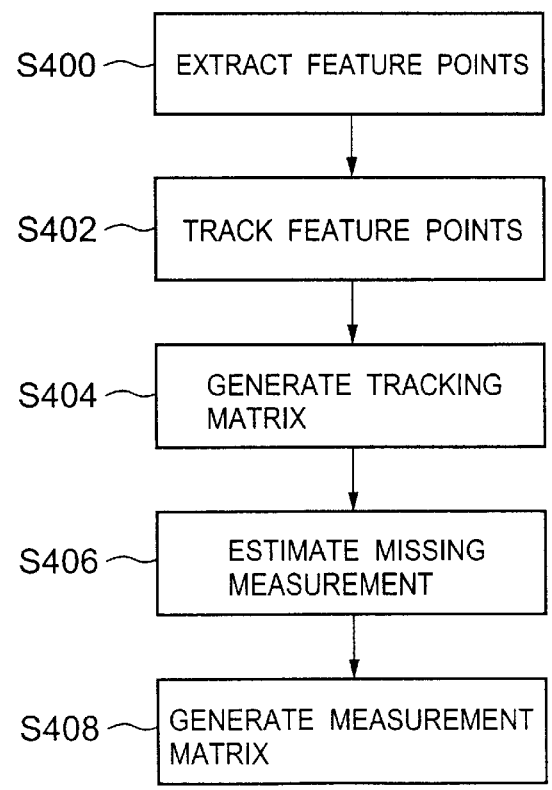
FIG. 4 is a flowchart showing a process performed by a 2-dimensional-data operation unit of FIG. 2.

FIG. 4 is a flowchart showing a process performed by the 2-dimensional-data operation unit 112.

At a step S400, the 2-dimensional-data operation unit 112 reads an image frame from the memory of the computer 116, and extracts feature points by detecting small image areas showing a significant change in image levels. Preferably, the extracted feature points are ranked by the magnitude of their image-level changes. The larger the image-level changes, the higher the rank is.

At a step S402, the 2-dimensional-data operation unit 112 tracks the feature points by matching them between successive frames. If a ranking of the feature points is available, tracking is conducted with respect to a predetermined number of feature points ranked higher than the rest. In tracking the feature points, pattern matching is applied between feature points of a current frame and feature points of a next frame, and feature points that are found to match are tracked from the current frame to the next frame. When there are many patterns similar to each other, it is possible to fail to correctly match the feature points, resulting in a tracking failure.

In order to avoid such a tracking failure, the rotation direction of the rotator base 100, which is indicated by the rotation-direction data supplied from the driver unit 106, is used as constraints in the feature point tracking. If the rotation direction does not coincide with the direction in which the matched feature points are shifting, tracking results are likely to be incorrect. In this case, the tracking results are disposed of. If a given feature point can not be paired with a corresponding feature point in another frame, it is treated as a missing measurement. In order to further reduce errors, it is preferable to utilize the marks M provided at the perimeter of the rotator base 100. When a comparison is made between the current frame and the next frame, one of the marks which has a y coordinate closest to the y coordinate of a given feature point is selected. If the motion vector of this feature point is directed in an opposite direction to the motion vector of the selected mark, or if the motion vector of this feature point differs in magnitude thereof from the motion vector of the selected mark by more than a predetermined threshold, a tracking failure is declared, and a result of the tracking is disposed of.

At a step S404, the 2-dimensional-data operation unit 112 generates a 2F-x-P tracking matrix as shown in the equation (5) from the tracking results of the step S402. Data of the tracking matrix is stored in the memory of the computer 116. Although it was not expressly pointed out in the above description, data obtained at the steps S400 and S402 are also stored temporarily in the memory of the computer 116.

As previously described, the tracking matrix generally have some matrix elements (missing measurements) for which no coordinates of corresponding feature points are obtained. Missing measurements come into existence due to occlusion of feature points by an object itself, fluctuation of light, failure of feature point tracking, etc.

At a step S406, the 2-dimensional-data operation unit 112 estimates the missing measurements (missing matrix elements) of feature points in the tracking matrix.

At a step S408, a measurement matrix as shown in the equation (7) is generated based on the tracking matrix having the missing measurements (missing matrix elements) thereof estimated. The obtained measurement matrix is stored in the memory of the computer 116.

In the following, the process of estimating missing measurements (missing matrix elements) at the step S406 will be described. Prior to describing details of the process, a basic principle of this process will be described.

Figures 5, 6:
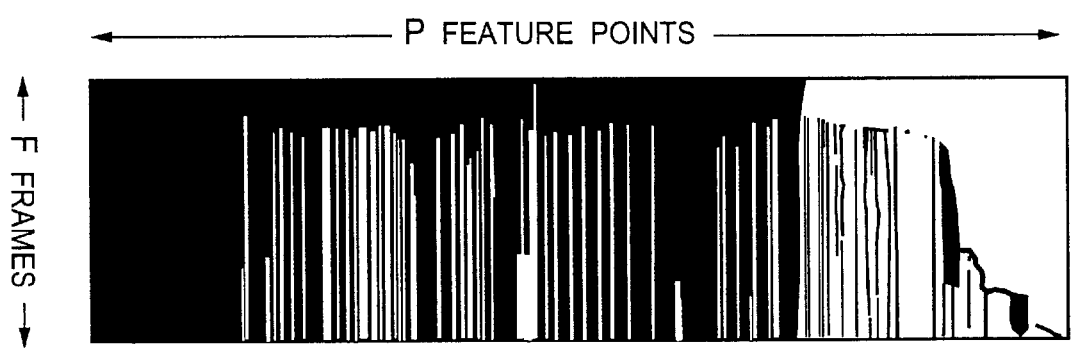
FIG. 5 is an illustrative drawing showing an example of a tracking matrix obtained by tracking 7 feature points through 8 frames.
FIG. 6 is an illustrative drawing showing a tracking matrix obtained from an image stream.

FIG. 5 is an illustrative drawing showing an example of a tracking matrix obtained by tracking 7 feature points through 8 frames.

In the figure, the symbol "." indicates a successful tracking of a feature point, and, thus, a coordinate is available as a matrix element. The symbol "?" indicates a tracking failure, and, thus, a matrix element lacks a measurement. Since a matrix having missing measurements (missing matrix elements) cannot be used in the factorization method, the missing measurements need to be estimated or interpolated. In order to estimate a missing measurement, known coordinates which surround a missing measurement are utilized. First, a missing measurement to be estimated is selected. Then, part of the tracking matrix is defined as a sub-matrix such as to include the selected missing measurement. This sub-matrix is hereinafter called an estimation matrix. The estimation matrix must have only one missing measurement to be estimated, and all the other elements must be known (i.e., provided with a corresponding coordinate).

In the illustration of FIG. 5, one missing measurement means data of a single feature point corresponding to a certain frame. Since a single feature point has both x and y coordinates in a given frame, one missing measurement actually refers to two missing elements in a matrix when the matrix includes x coordinates as well as y coordinates as matrix elements thereof.

In the tracking matrix of FIG. 5, a missing measurement of the sixth feature point at the fifth frame is selected as a value to be estimated, for example. In this case, a sub-matrix as shown by a rectangle box is defined as an estimation matrix. By using this estimation matrix, the selected missing measurement is estimated. Then, the estimate is inserted into the tracking matrix to fill in the selected missing measurement. Thereafter, a missing measurement of the sixth feature point at the sixth frame is selected as a value to be estimated, for example, and an estimation matrix is generated. This estimation matrix maybe comprised of 6 columns corresponding to the first to sixth feature points and 6 rows corresponding to the first to sixth frames. An estimate of the missing measurement is then obtained, and is inserted into the tracking matrix to fill in the missing measurement. Further, a missing measurement of the seventh feature point at the second frame is selected as a value to be estimated, for example, and an estimation matrix is generated by including columns corresponding to the first through seventh feature points and rows corresponding to the second through sixth frames. An estimate is then obtained based on this estimation matrix. In this manner, missing measurements (missing matrix elements) are successively estimated until all the missing measurements in the tracking matrix are interpolated.

A method of estimating a missing measurement in an estimation matrix includes a row-expansion method and a column-expansion method. An estimation matrix as follows has missing measurements $u_{fp}$ and $v_{fp}$ to be estimated.

$$\tilde{W} = \begin{bmatrix} u_{(f-m)(p-n)} & u_{(f-m)(p-n+1)} & \cdots & u_{(f-m)p} \\ u_{(f-m+1)(p-n)} & u_{(f-m+1)(p-n+1)} & \cdots & u_{(f-m+1)p} \\ \vdots & \vdots & \vdots & \vdots \\ u_{f(p-n)} & u_{f(p-n+1)} & \cdots & u_{fp} \\ v_{(f-m)(p-n)} & v_{(f-m)(p-n+1)} & \cdots & v_{(f-m)p} \\ v_{(f-m+1)(p-n)} & v_{(f-m+1)(p-n+1)} & \cdots & v_{(f-m+1)p} \\ \vdots & \vdots & \vdots & \vdots \\ v_{f(p-n)} & v_{f(p-n+1)} & \cdots & v_{fp} \end{bmatrix} \quad (19)$$

According to the row-expansion method, a sub-matrix is generated from the estimation matrix by excluding rows having the missing measurements included therein. Then, the sub-matrix is decomposed by the factorization method as follows.

$$\hat{W}_{2m \times (n+1)} - T[1 \ldots 1] = M_{2m \times 3} S_{3 \times (n+1)} \quad (20)$$

$M_{2m \times 3}$ is a matrix that represents camera positions with respect to 2m frames, and $S_{3 \times (n+1)}$ is a matrix that represents 3-dimensional coordinates of n+1 feature points. A n+1-th feature point ($u_{fp}$, $v_{fp}$) in the m+1-th frame satisfies the following equations.

$$u_{fp} - x_f = m_f^T \cdot S_p \quad (21)$$

$$v_{fp} - y_f = n_f^T \cdot S_p \quad (22)$$

$$x_f = \frac{1}{n+1} \sum_{i=0}^{n} u_{f(p-n+i)}, \quad y_f = \frac{1}{n+1} \sum_{i=0}^{n} v_{f(p-n+i)}$$

Each of the equations (21) and (22) includes four unknown parameters $u_{fp}$, $m_f^T$, $v_{fp}$, and $n_f^T$. Accordingly, the number (n+1) of known feature points needs to be at least four in order to determine these four unknown parameters. In consideration of noise factors, however, the number of known feature points is preferably set to more than four so as to solve the equations (21) and (22) by use of a least square method under over-constrained conditions.

First, the following expansions are obtained.

$$nu_{f(p-n)} - u_{f(p-n+1)} \ldots - u_{fp} = (n+1)m_f^T \cdot S_{p-n} \quad (22.1)$$

$$-u_{f(p-n)} + nu_{f(p-n+1)} \ldots - u_{fp} = (n+1)m_f^T \cdot S_{p-n} \quad (22.2)$$

.

.

.

$$-u_{f(p-n)} - u_{f(p-n+1)} \ldots + nu_{fp} = (n+1)m_f^T \cdot S_{p-n} \quad (22.n+1)$$

Equations other than the equation (22.n+1) are organized as:

$$\begin{bmatrix} S_{p-n}^T - S_{p-n+1}^T \\ S_{p-n}^T - S_{p-n+2}^T \\ \vdots \\ S_{p-n}^T - S_{p-1}^T \\ S_{p-n+1}^T - S_{p-n+2}^T \\ \vdots \\ S_{p-n+1}^T - S_{p-1}^T \\ S_{p-n+2}^T - S_{p-n+3}^T \\ \vdots \\ S_{p-2}^T - S_{p-1}^T \end{bmatrix} \cdot m_f = \begin{bmatrix} u_{f(p-n)} - u_{f(p-n+1)} \\ u_{f(p-n)} - u_{f(p-n+2)} \\ \vdots \\ u_{f(p-n)} - u_{f(p-1)} \\ u_{f(p-n+1)} - u_{f(p-n+2)} \\ \vdots \\ u_{f(p-n+1)} - u_{f(p-1)} \\ u_{f(p-n+2)} - u_{f(p-n+3)} \\ \vdots \\ u_{f(p-2)} - u_{f(p-1)} \end{bmatrix} \quad (23)$$

From this equation, $m_f$ is obtained. Further, the equation (22.n+1) is reorganized as:

$$u_{fp} = \frac{1}{n}\left((n+1)m_f^T \cdot S_p + \sum_{n=1}^{n} u_{f(p-n)}\right) \quad (24)$$

By substituting the obtained $m_f$, a coordinate $u_{fp}$ is obtained. By following similar steps, a coordinate $v_{fp}$ is obtained by $$v_{fp} = \frac{1}{n}\left((n+1)n_f^T \cdot S_p + \sum_{n=1}^{n} v_{f(p-n)}\right) \quad (25)$$

In what follows, a column-expansion method will be described.

In contrast to the row-expansion method, the column-expansion method requires a creation of a sub-matrix from the estimation matrix (19) by excluding columns which include the missing measurements therein. The obtained sub-matrix is decomposed via the factorization method as follows.

$$\hat{W}_{2(m+1) \times n} - T[1 \ldots 1] = M_{2(m+1) \times 3} S'_{3 \times n} \quad (26)$$

$M_{2(m+1) \times 3}$ is a matrix that represents camera positions with respect to 2(m+1) frames, and $S_{3 \times n}$ is a matrix that represents 3-dimensional coordinates of n feature points. A n+1-th feature point ($u_{fp}$, $v_{fp}$) in the m+1-th frame satisfies the following equations.

$$u_{fp} - x_f = m_f^T \cdot S_p \quad (27)$$

$$v_{fp} - y_f = n_f^T \cdot S_p \quad (28)$$

$$x_f = \frac{1}{n+1} \sum_{i=0}^{n} u_{f(p-n+i)}, \quad y_f = \frac{1}{n+1} \sum_{i=0}^{n} v_{f(p-n+i)}$$

The equation (26) is satisfied up to the n feature points, and the equations (27) and (28) are satisfied up to the (n+1) feature points. Namely, $S'_1 + S'_2 + \ldots + S'_n$ is 0 while $S_1 + S_2 + \ldots + S_{n+1}$ should be 0. By denoting $S_{n+1}$ as $-nC$, $$\sum_{p=1}^{n} S_p - nC = \sum_{p=1}^{n}(S_p - C) = 0 \quad (29)$$

is obtained. As a result, $$S'_p = S_p - C, \, p=1, \ldots, n \quad (30)$$

$$C = \frac{1}{n}\sum_{p=1}^{n} S_p$$

is obtained. Here, $x_f$ and $y_f$ appearing in the equations (27) and (28), respectively, need to be modified as follows.

$$x_f = (nx'_f + u_{fp})/(n+1)$$
$$y_f = (ny'_f + v_{fp})/(n+1) \quad (31)$$

By substituting the equations (30) and (31) into the equations (27) and (28), $$u_{fp} - x'_f = (n+1)(m_f^T \cdot S_p)/n$$
$$v_{fp} - y'_f = (n+1)(n_f^T \cdot S_p)/n \quad (32)$$

are obtained. $S_p$, $u_{fp}$, and $v_{fp}$ are obtained from the equations (32).

The larger the size of the estimation matrix, the more accurate the obtained estimate is. Use of a large estimation matrix, however, entails a higher computation cost for estimation of a single missing measurement. In the present invention, therefore, an estimation matrix having an appropriate size is generated to estimate a missing measurement. When estimation fails, a size of an estimation matrix is increased. Estimation is repeated many times, if necessary, by gradually increasing a size of an estimation matrix until a proper estimate is successfully obtained. In order to make it easier to make an estimate while gradually increasing a size of an estimation matrix, the present invention performs reshaping processing, which rearranges columns of the tracking matrix. Further, when an estimation matrix cannot be generated despite presence of remaining missing measurements, the tracking matrix is turned upside down to continue the estimation process.

Since the present invention attends to estimation of missing measurements (missing matrix elements) by gradually increasing a size of an estimation matrix, computation costs of estimation of missing measurements stay relatively low. Further, reshaping processing and turning upside down of a tracking matrix make it easier to conduct the estimation process, thereby allowing more reliable and efficient estimation of a larger number of missing measurements than it would otherwise be. In this manner, an accurate 3-dimensional shape can be extracted even if there are a large number of missing measurements in a tracking matrix.

In what follows, reshaping processing and turning upside down of a tracking matrix will be described.

FIG. 6 is an illustrative drawing showing a tracking matrix obtained from an image stream.

In FIG. 6, hatched areas indicate portions of the matrix where coordinates of feature points are obtained, and blank areas indicate portions where no coordinates are obtained (i.e., there are missing measurements). As can be seen from the tracking matrix, feature points can be classified by conditions of tracking.

According to the present invention, feature points are classified into four groups by patterns of time frames during which tracking is successful.

Figure 7:
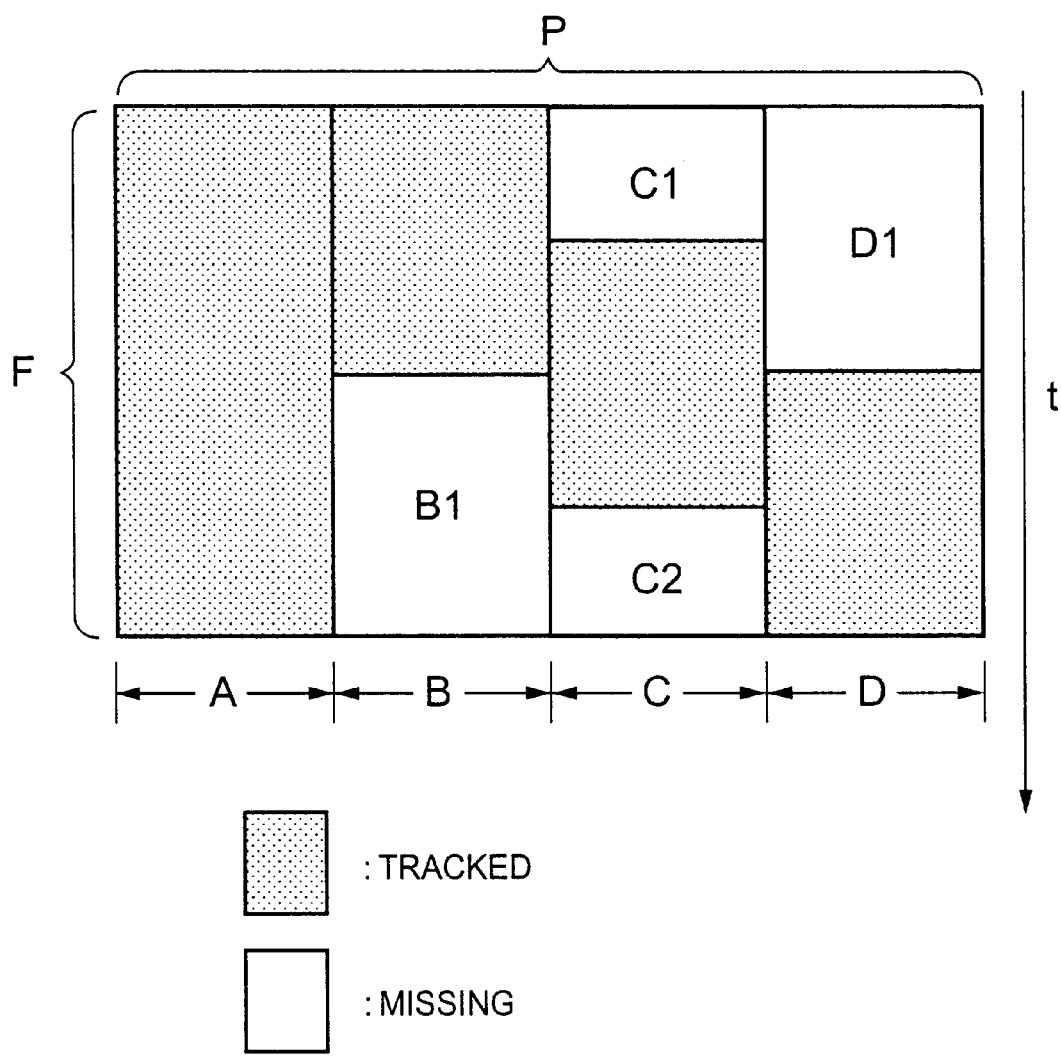
FIG. 7 is an illustrative drawing showing a tracking matrix obtained through reshaping processing according to classification of feature points into four groups.

A Group: feature points for which tracking is successful from the first frame to the last frame B Group: feature points for which tracking is successful from the first frame but fails before it reaches the last frame C Group: feature points for which tracking starts succeeding only from halfway through the entire sequence and fails before it reaches the last frame D Group: feature points for which tracking is successful from halfway through the entire sequence until the last frame FIG. 7 is an illustrative drawing showing a tracking matrix obtained through reshaping processing according to the classification of feature points into the four groups.

In FIG. 7, hatched areas indicate portions of the matrix where coordinates of feature points are obtained, and blank areas indicate portions where no coordinates are obtained (i.e., there are missing measurements).

By using the reshaped tracking matrix as described above, missing measurements (missing matrix elements) are estimated. First, missing measurements included in a portion B1 and a portion C2 shown in FIG. 7 are estimated. Thereafter, missing measurements included in a portion C1 and a portion D1 shown in FIG. 7 are estimated by turning the tracking matrix upside down.

Because of the reshaping process, columns (feature points) classified as the group A are known to have no missing measurements. This helps to simplify a process of generating an estimation matrix. Namely, an estimation matrix for estimating a missing element in a column selected from one of the groups B, C, and D is easily generated by selecting all the remaining columns of the estimation matrix from the group A without checking if the selected columns includes missing measurements.

Since estimation of a missing measurement may fail with a particular estimation matrix used for the estimation, a size of an estimation matrix is gradually increased until the estimation is successful. When an estimate of a missing measurement is successfully obtained, the obtained estimate fills in the missing measurement, and is used as a valid coordinate when reshaping processing is repeated.

In summary, reshaping of a tracking matrix, generation of an estimation matrix, and estimation of a missing measurement are repeated, and the columns of the tracking matrix classified into the group A described above increases in number until finishing conditions are satisfied. The finishing conditions stipulate that all the missing measurements are estimated or an estimation matrix can no longer be generated despite presence of remaining missing measurements. If a missing measurement still remains, the tracking matrix is turned upside down, and, then, the estimation process is continued.

Figure 8:
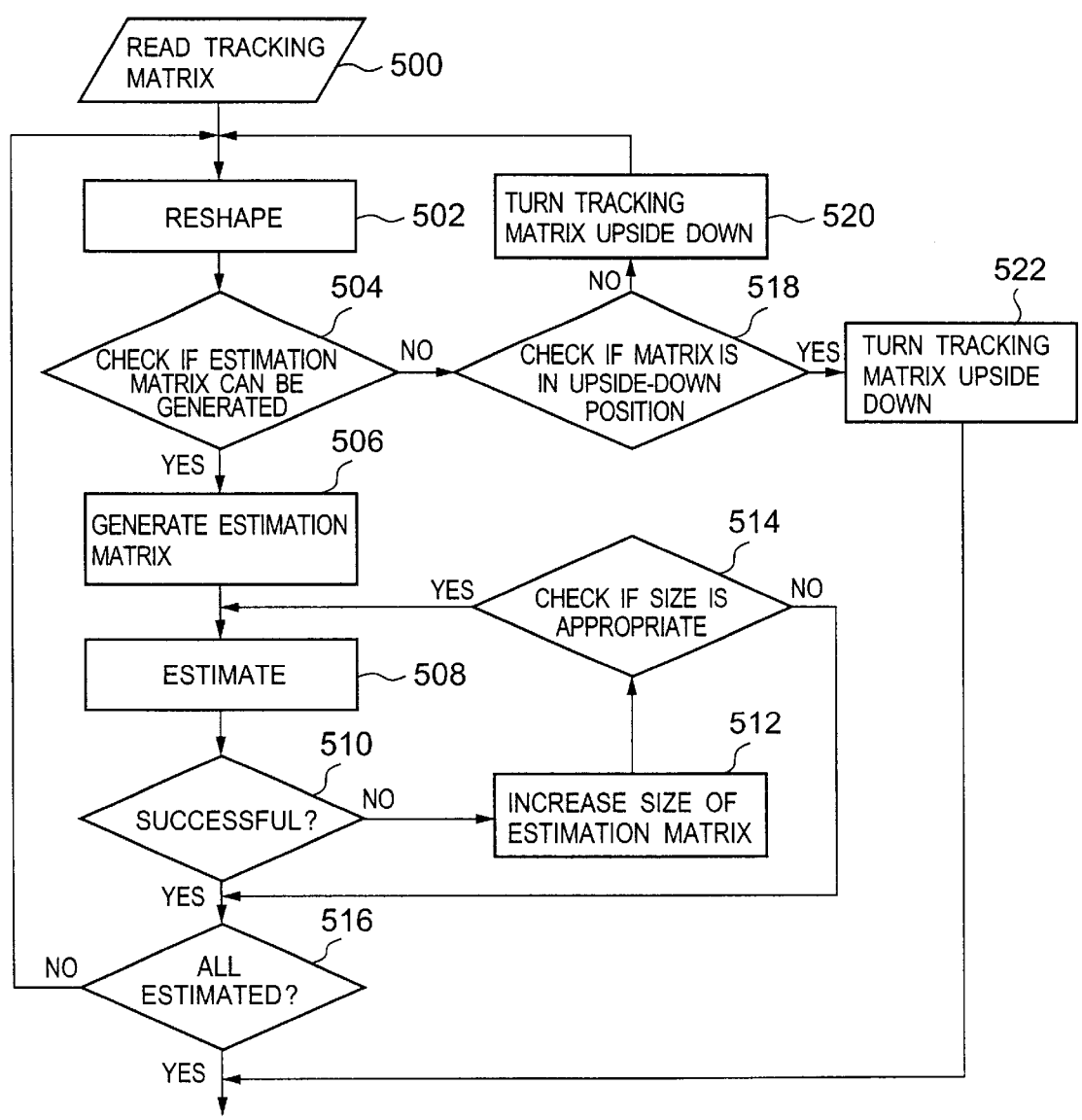
FIG. 8 is a flowchart of a process of generating an estimation matrix and estimating missing measurements.

FIG. 8 is a flowchart of a process of generating an estimation matrix and estimating missing measurements. This process is performed by the estimation-matrix-generation unit 112-2 and the missing-measurement-estimation unit 112-3 of the 2-dimensional-data operation unit 112.

At a step S500, a tracking matrix is read from the memory of the computer 116.

At a step S502, reshaping processing is applied to the tracking matrix.

At a step S504, a check is made as to whether an estimation matrix can be generated for estimation of missing measurements. If it can, the procedure goes to a step S506. Otherwise, the procedure goes to a step S518.

At the step S506, an estimation matrix is generated with respect to a missing measurement (two coordinates to be estimated.

At a step S508, an estimation process is carried out.

At a step S510, a check is made as to whether the estimation process is successful. If it is, the obtained estimates fill in the missing measurements.

If the estimation process is unsuccessful, at a step S512, size of the estimation matrix is increased.

At a step S514, a check is made as to whether the increased size is smaller than a predetermined maximum size. If it is, the estimation matrix having the increased size is generated, and an estimation process is carried out again at the step S508.

If the estimation process is successful or if the increased size of the estimation matrix is no smaller than the predetermined maximum size, a check is made at a step S516 as to whether all the missing measurements are estimated. If there is no remaining missing measurement, the procedure comes to an end. In this case, the obtained tracking matrix is stored in the memory of the computer 116.

If there is a remaining missing measurement, the procedure goes back to the step S502 to continue estimation of remaining missing measurements.

If generation of an estimation matrix is not possible despite presence of remaining missing measurements, the procedure goes from the step S504 to a step S518.

At the step S518, a check is made whether the tracking matrix is in an upside-down position.

If the tracking matrix is not in an upside-down position, at a step S520, the tracking matrix is turned upside down. The procedure then goes back to the step S502 to repeat the estimation process.

If the tracking matrix is in an upside-down position with a missing measurement, and if generation of an estimation matrix is no longer possible, the procedure goes from the step 504, the step S518, to a step S522.

At the step S522, the tracking matrix is turned into an upright position. Then, the procedure comes to an end. The obtained tracking matrix is stored in the memory of the computer 116.

In what follows, generation of an estimation matrix will be described further in detail.

In order to achieve a highly accurate estimation, an estimation matrix is preferably generated by using coordinates of such feature points as assumptions for approximating the linear-projection model are well satisfied. As previously described, the paraperspective projection model is a first-order approximation of the perspective projection model when the perspective projection model is expanded around the distance between the camera center and the center of gravity of an object. Such a paraperspective projection model assumes the following conditions.

$$k_f \cdot s_p \approx 0 \tag{33}$$

$$|s_p|^2 / z_f^2 \approx 0 \tag{34}$$

The equation (34) represents an assumption that a size of an object is much smaller than a distance $z_f$ between the camera and the object. The equation (33) represents an assumption that projections of feature points onto the camera optical axis are very small. If all the feature points are located on the imaginary plane of the model, the paraperspective projection model becomes identical to the perspective projection model.

Accordingly, it is fair to say that the equation (33) stipulates conditions that should be satisfied when generating an estimation matrix.

The imaginary plane is parallel to the image plane of the camera, and the camera's position varies from frame to frame unless the camera motion is a parallel movement. When the camera motion is erratic, therefore, it is difficult to satisfy the conditions stipulated by the equation (33). In moving pictures taken by a video camera, however, changes in the camera position between successive frames are rather small, so that a set of locally concentrating feature points may satisfy the conditions of the equation (33). In light of this, the estimation matrix is preferably generated from the tracking matrix by selecting those points which are distributed closely to a missing measurement that is to be estimated.

The problem is, however, that a spatial position of the missing measurement is not known. To obviate this problem, feature points are assumed to exhibit parallel motion between successive frames, and a measurement found in an immediately preceding frame is used as an estimate of the position of the missing measurement. This measurement is hereinafter called a substitute measurement. Then, feature points that are closest to the substitute measurement are selected to generate the estimation matrix. This method is suitable when motion of feature points is small between successive frames of moving pictures.

Figure 9:
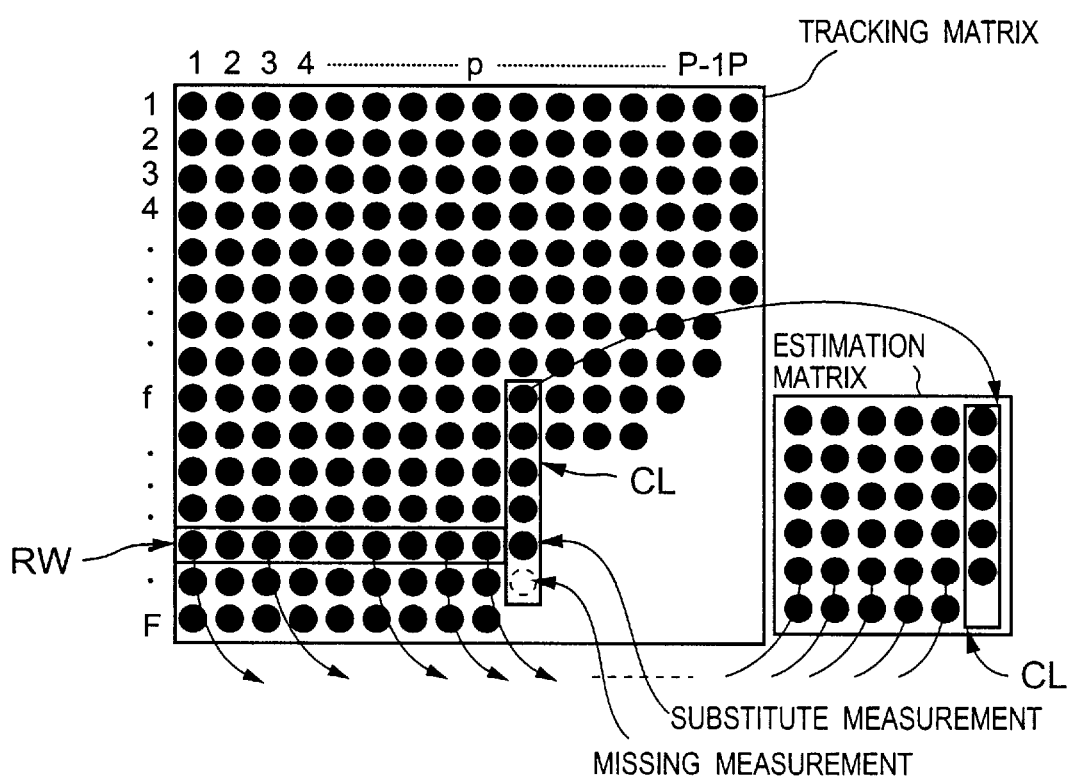
FIG. 9 is an illustrative drawing for explaining a process of generating an estimation matrix.

FIG. 9 is an illustrative drawing for explaining a process of generating an estimation matrix.

As shown in FIG. 9, when estimating a missing measurement included in a sub-column cl, a substitute measurement for the missing measurement is found in a previous frame. Then, matrix elements in a row RW corresponding to the same frame as that of the substitute measurement are compared with the substitute measurement, and a predetermined number of the matrix elements closest to the substitute measurement are selected. Sub-columns having these selected elements therein are extracted from the tracking matrix, and are added to the sub-column CL to generate an estimation matrix.

In the following, an operation of the 3-dimensional-data operation unit 114 will be described.

Figure 10:
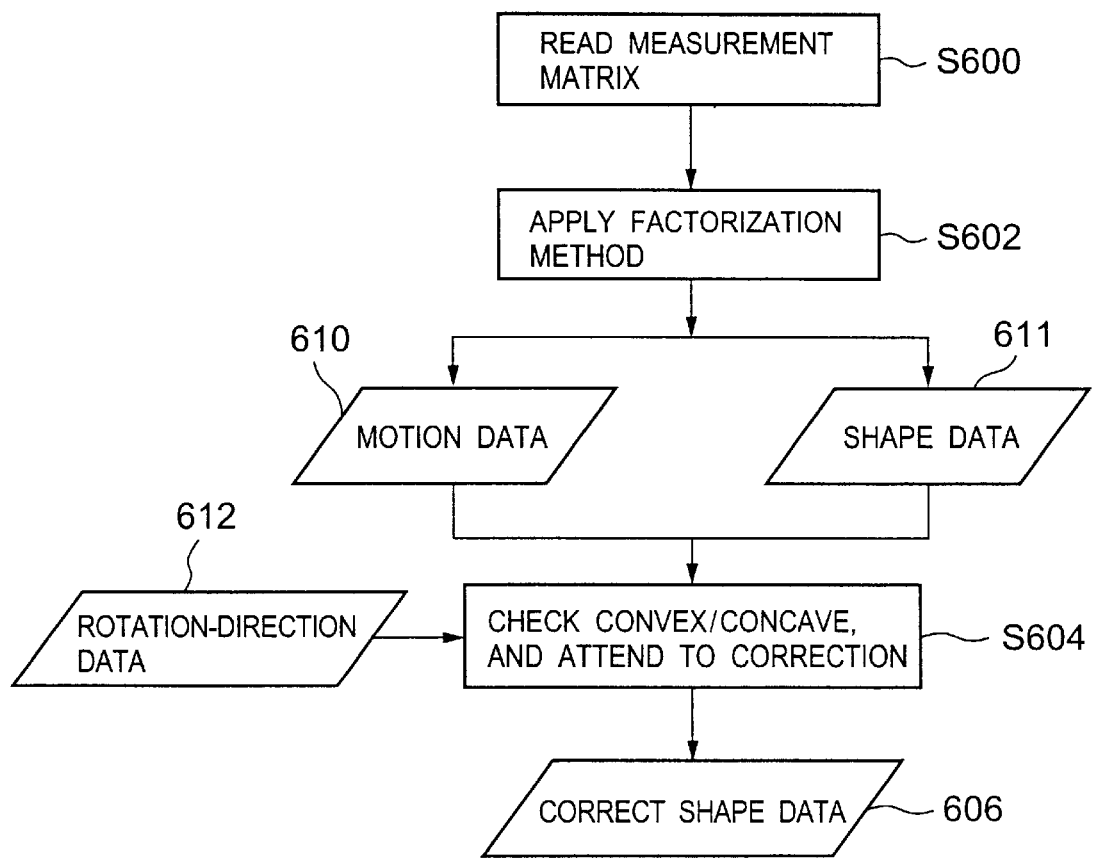
FIG. 10 is a flowchart of a process performed by a 3-dimensional-data operation unit of FIG. 2.

FIG. 10 is a flowchart of a process performed by the 3-dimensional-data operation unit 114.

At a step S600, the 3-dimensional-data operation unit 114 reads the measurement matrix from the memory of the computer 116 where the measurement matrix is generated by 2-dimensional-data operation unit 112.

At a step S602, the factorization method is applied to the measurement matrix. As a result, 3-dimensional shape data (coordinates) 611 of the object feature points are obtained, and, also, 3-dimensional motion data 610 representing relative motion between the feature points and the camera is obtained.

Factorization does not have a unique solution, but has two solutions. This presents a problem that a distinction cannot be made as to whether an object surface is concave or convex. According to the present invention, a decision is made at a step S604 as to whether an object surface is concave or convex, thereby producing shape data 606 having correct representation of a surface shape.

Figure 11:
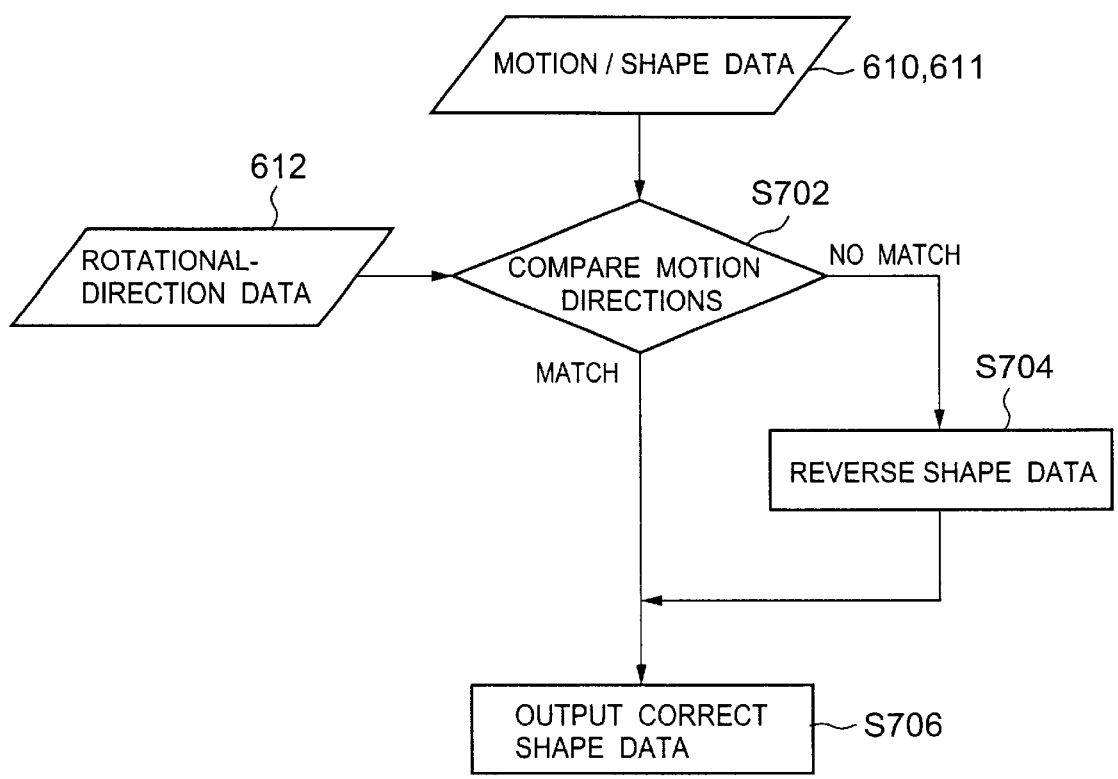
FIG. 11 is a flowchart showing a process performed at a step S604 of FIG. 10.

FIG. 11 is a flowchart showing a process performed at the step S604 of FIG. 10.

At a step S702, a comparison is made between the 3-dimensional motion/shape data 610/611 and rotation-direction data 612 obtained from the driver unit 106 so as to check whether there is a match between the rotation direction of the rotator base 100 and the motion direction of the object feature points.

At a step S706, the shape data is output as correct data if the shape data has a motion direction that matches the rotation direction.

If the directions do not match, at a step S704, the shape data is rearranged back in front in a z-axis direction to reverse a concave-convex relation. At the step S706, the corrected shape data is output.

In this manner, the present invention rearranges the shape data back in front when the rotation direction of an actual object and the motion direction of feature points do not match after the motion direction of feature points are obtained from the measurement matrix. Therefore, the preset invention can obtain an accurate object shape having correct convex-concave representation.

The image-input unit 110, the 2-dimensional-data operation unit 112, and the 3-dimensional-data operation unit 114 shown in FIG. 2 may be implemented based on software running on the computer 116 or another computer. By the same token, any processes described in connection with FIG. 3, FIG. 4, FIG. 8, FIG. 10, and FIG. 11 may be implemented as software.

Figure 12:
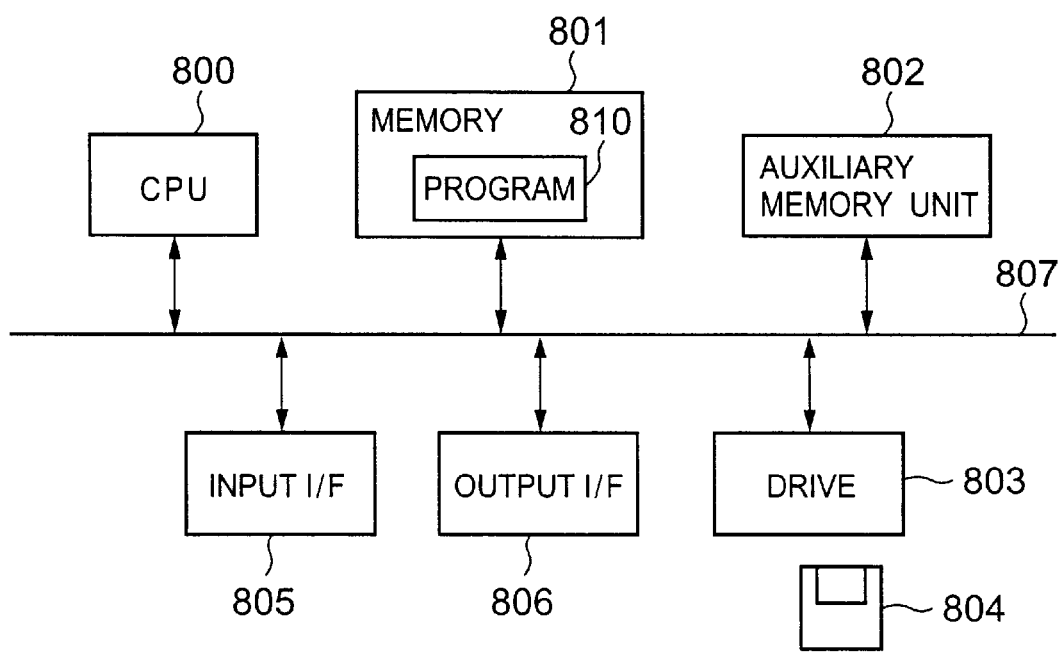
FIG. 12 is a block diagram showing an example of a configuration of a computer that is used for implementing functions of the present invention.

FIG. 12 is a block diagram showing an example of a configuration of a computer that is used for implementing functions of the present invention.

The computer of FIG. 12 includes a CPU 800, a memory 801, an auxiliary memory unit 802, a memory drive 803 for reading and writing information from and to a memory medium 804 such as a floppy disk, an input interface 805, an output interface 806, and a system bus 807, which connects these elements together.

A program 810 for causing the computer to perform processes described in connection with FIG. 3, FIG. 4, FIG. 8, FIG. 10, and FIG. 11 may be stored in the memory 801, and is executed by the CPU 800. The program 810 is originally recorded in the memory medium 804. The program 810 is loaded from the memory medium 804 to the memory 801 via the memory drive 803, or is initially loaded to the auxiliary memory unit 802 before being loaded to the memory 801 for subsequent execution thereof.

An image stream supplied from the digital-video camera 108 and the rotation-direction data supplied from the driver unit 106 may be input to the computer via the input interface 805. Shape data obtained as a final product may be stored in the auxiliary memory unit 802, or may be stored in the memory medium 804 via the memory drive 803.

As described above, the present invention reliably obtains data of feature points necessary for reconstruction of a 3-dimensional object shape even when there are missing elements in a tracking matrix. According to the present invention, data of feature points for reconstruction of a 3-dimensional shape representing an all-around view of an object is obtained when an image sequence is obtained by taking pictures of the object from viewpoints all around the object. Further, a computation time for generating feature point data is significantly reduced, and so is the size of a memory necessary for the computation. The obtained feature point data represents an accurate shape of an object without confusion between convex surfaces and concave surfaces. Further, an image having textures mapped on mesh surfaces thereof is automatically obtained.

In the following, other problems that need to be addressed in connection with the factorization method will be described.

The factorization method is generally applied to a tracking matrix as a whole, so that the missing measurements need to be estimated with respect to the entirety of the tracking matrix. When pictures of an object are taken from viewpoints all around the object, it is practically impossible to estimate all the missing measurements found in the tracking matrix. That is, it is almost impossible to obtain accurate data of feature points for an all-around view of the object shape.

Even if estimation of all the missing measurements succeeds, a computation time would be prohibitively lengthy. When 1000 feature points are tracked through 100 images, for example, the tracking matrix has 200 rows and 1000 columns. When practical applications are taken into consideration, there is often a case where densely arranged feature points are needed and data of these feature points needs to be generated for the all-around view of the object shape. In such a case, the number of feature points may even exceed 1000. Since the factorization method needs a vast amount of numerical calculation, a computation time becomes enormous if such a large matrix as described above is directly subjected to the factorization method. Also, a large memory size is required for the computation. For example, when the number of feature points exceed 400, the computation time increases in proportion to the cube of the tracking-matrix size.

Accordingly, there is a need for a method which can reliably generate data of feature points for reconstructing a 3-dimensional shape representing an all-around view of an object without requiring an impracticably lengthy computation time.

In what follows, a scheme for generating data of feature points for an all-around view of an object shape will be described according to the present invention.

Figure 13:
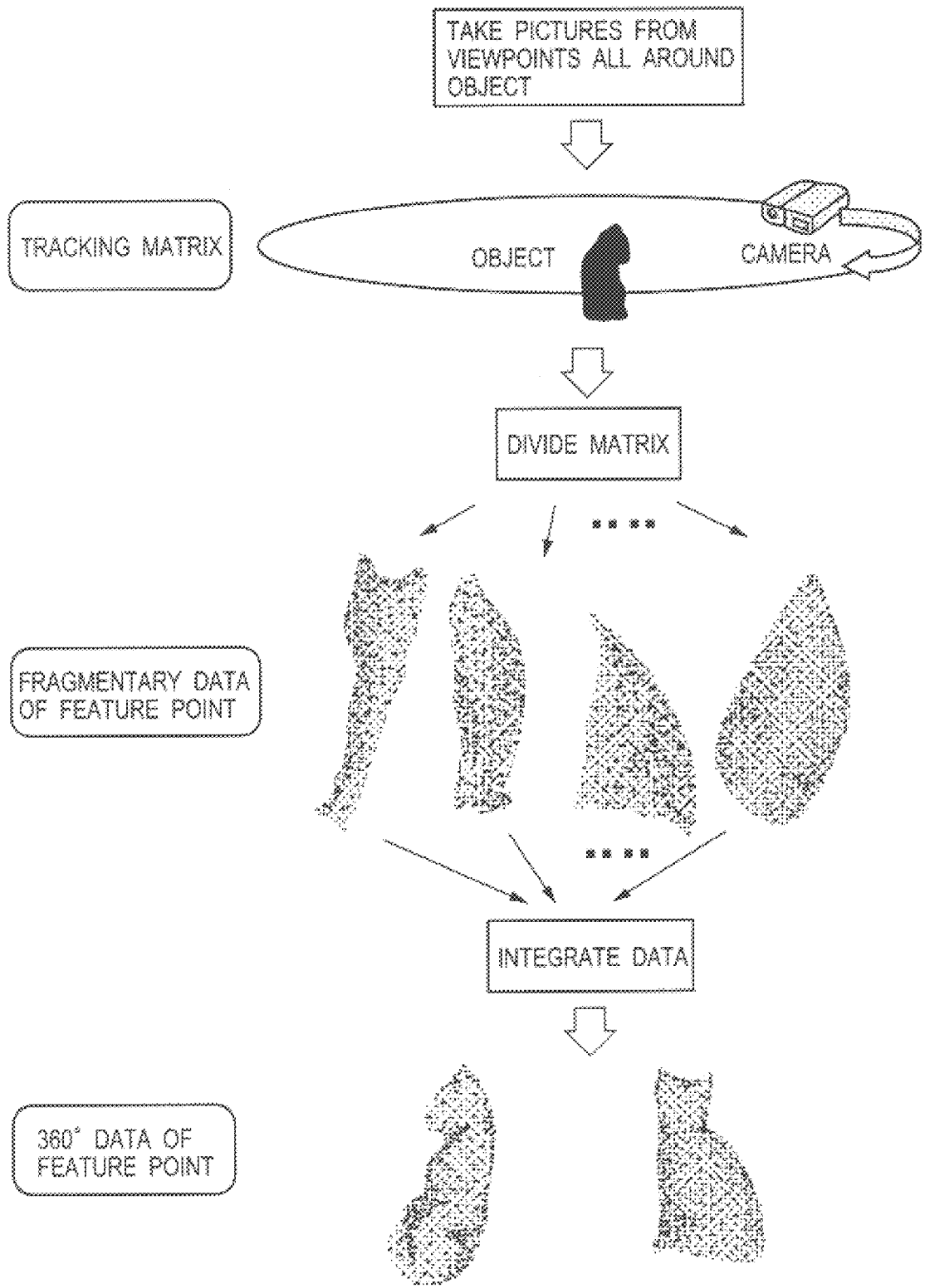
FIG. 13 is an illustrative drawing showing a scheme for generating data of feature points for an all-around view of an object shape.

FIG. 13 is an illustrative drawing showing a scheme for generating data of feature points for an all-around view of an object shape.

First, a camera (digital video camera or the like) is shifted around a fixed object, or an object is rotated while a camera position is fixed, so that an all-around view of the object shape is taken as pictures. Feature points of the object are tracked in an image sequence obtained from these pictures to generate a tracking matrix.

Second, the tracking matrix is divided into tracking sub-matrixes having overlapping portions with each other.

Then, missing measurements (missing matrix elements) are estimated in each of the tracking sub-matrixes so as to generate the tracking sub-matrixes having the missing measurements thereof estimated (hereinafter called measurement sub-matrixes). The factorization method is applied to each of the measurement sub-matrixes to generate fragmentary data of feature points that represents a corresponding fragmentary shape of the object.

Finally, all the fragmentary data of feature points obtained from all the measurement sub-matrixes are integrated, thereby generating 360° data of feature points representing an all-around view of the object shape.

Even if there are too many missing measurements in the original tracking matrix or even if some of the missing measurements are difficult to estimate, appropriately divided sub-matrixes make it possible to estimate missing measurements in each of the tracking sub-matrix for the purpose of generating fragmentary data of feature points. Further, appropriate division of the tracking matrix results in sufficiently smaller tracking sub-matrixes, so that a computation time required for generating fragmentary data of feature points is substantially shorter, resulting in a significant reduction in a total time length required for generating 360° data of feature points compared with when the original tracking matrix is subjected to the factorization method.

In the following, an embodiment directed to this aspect of the present invention will be described with reference to an automatic generation of 360° data of feature points and a 3-dimensional-shape generation system which automatically selects texture mapping images for reconstruction of a 3-dimensional view of the object.

Figure 14:
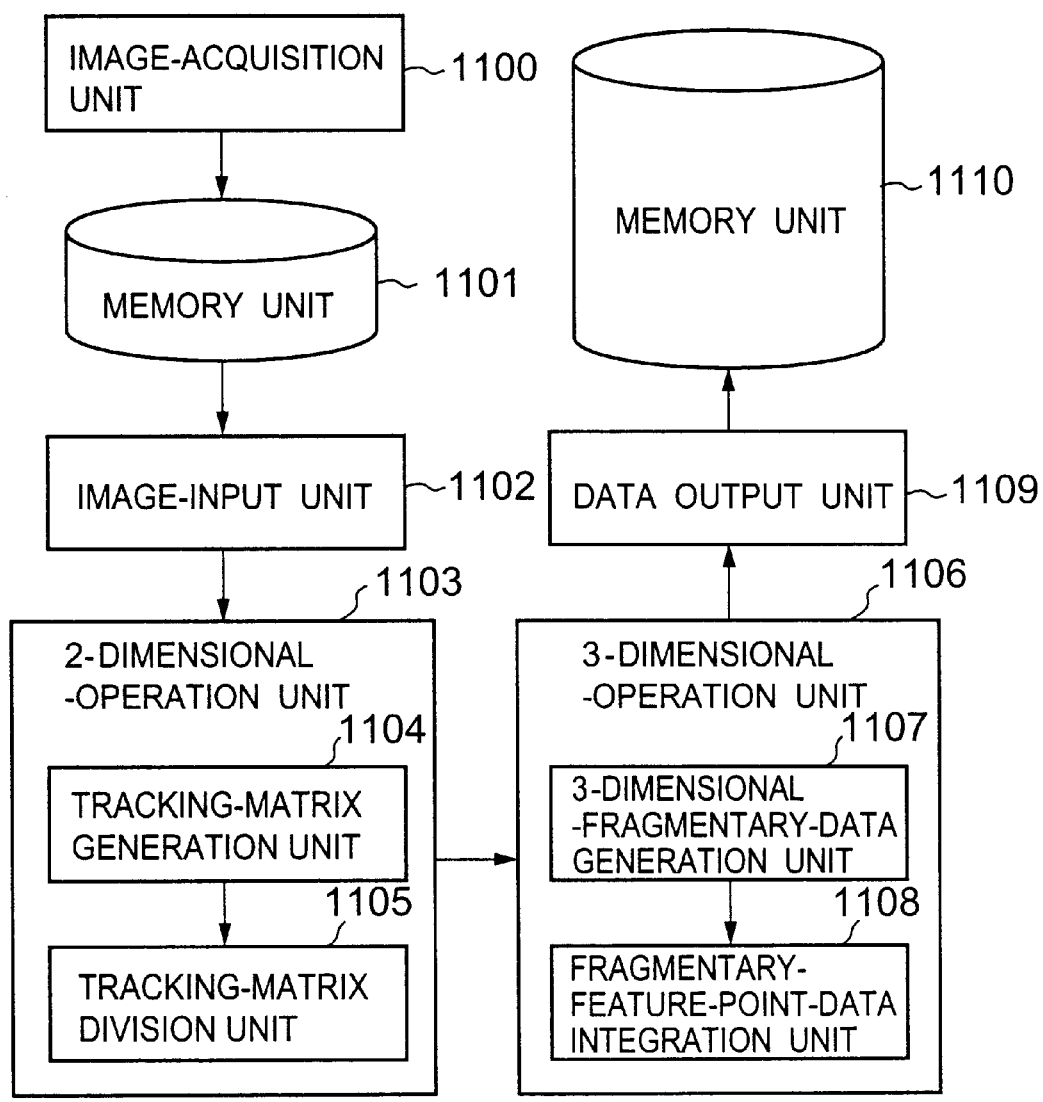
FIG. 14 is a block diagram of a 3-dimensional-shape generation system.

FIG. 14 is a block diagram of a 3-dimensional-shape generation system.

In FIG. 14, an image-acquisition unit 1100 obtains an image sequence by taking pictures of an object from all the directions around the object. A digital video camera or the like may be used for this purpose. A memory unit 1101 stores data of the image sequence. The data of the image sequence is supplied from the memory unit 1101 to a 2-dimensional-operation unit 1103 via an image-input unit 1102. The 2-dimensional-operation unit 1103 includes a tracking-matrix generation unit 1104 and a tracking-matrix division unit 1105. The tracking-matrix generation unit 1104 tracks feature points in the image sequence data to generate a tracking matrix. The tracking-matrix division unit 1105 divides the tracking matrix to generate a plurality of tracking sub-matrixes having overlapping portions therebetween. Operations of the tracking-matrix generation unit 1104 and the tracking-matrix division unit 1105 will be described later in detail.

Data processed by the 2-dimensional-operation unit 1103 is supplied to a 3-dimensional-operation unit 1106. The 3-dimensional-operation unit 1106 includes a 3-dimensional-fragmentary-data generation unit 1107 and a fragmentary-feature-point-data integration unit 1108, and attends to generation of feature-point data representing a 3-dimensional shape of the object and selection of appropriate texture-mapping images. These operations will be described later in detail. Data generated by the 3-dimensional-operation unit 1106 is supplied to a memory unit 1110 via a data output unit 1109, and is stored in the memory unit 1110.

In the following, operation of each unit will be described.

[Tracking-matrix Generation Unit 1104]

Figure 15:
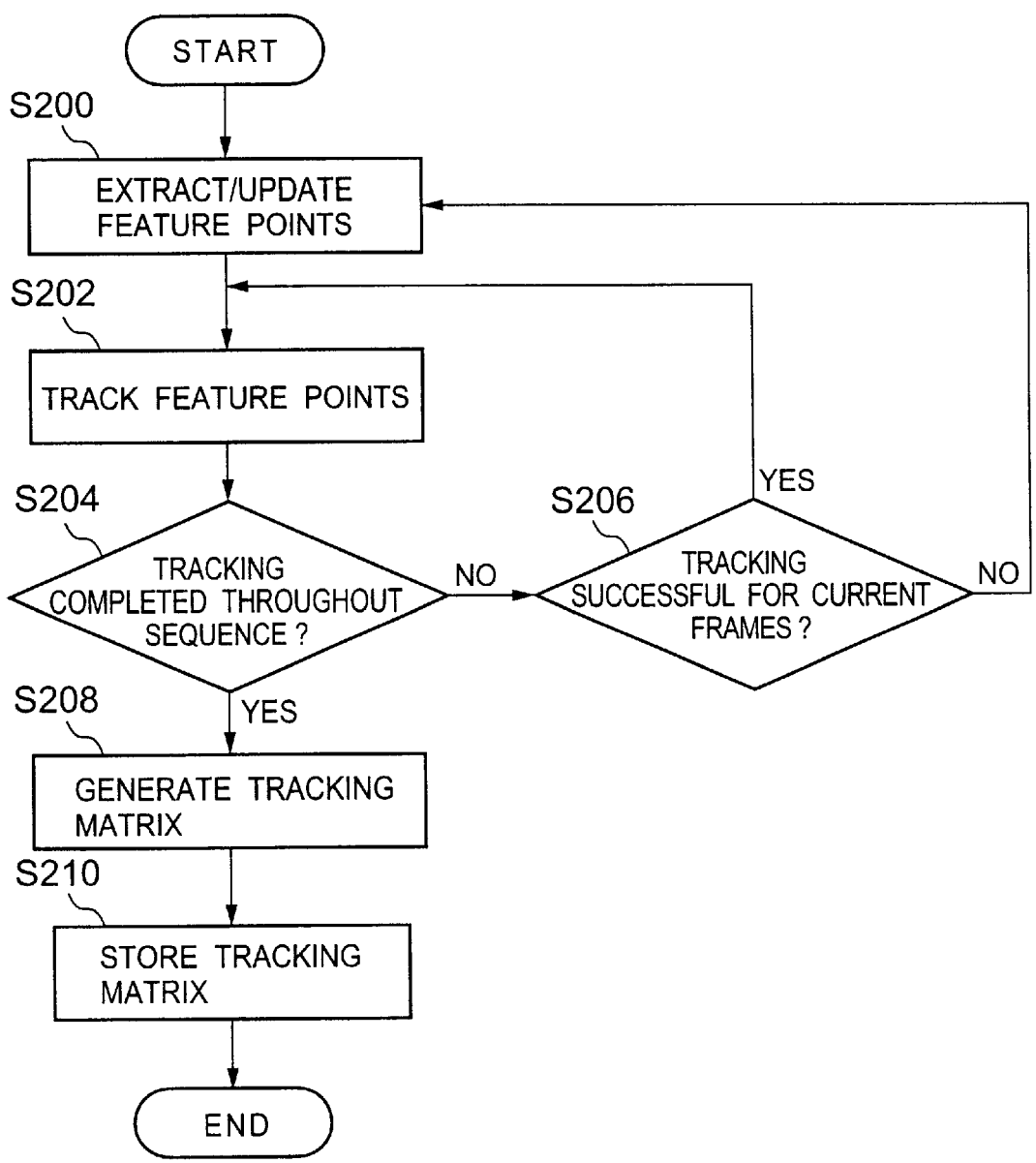
FIG. 15 is a flowchart of a process performed by a tracking-matrix generation unit of FIG. 14.

FIG. 15 is a flowchart of a process performed by the tracking-matrix generation unit 1104.

At a step S200, feature points are extracted from each frame of the image sequence by detecting small image areas showing a significant change in image levels. Preferably, the extracted feature points are ranked by the magnitude of their image-level changes. The larger the image-level change, the higher the rank is. Then, a predetermined number of feature points are selected from these feature points by picking up those having the highest ranks.

At a step S202, correspondences of the selected feature points are found between two successive frames of the image sequence to track the feature points from one frame to the other. In detail, pattern matching is conducted between feature points in one frame and feature points in the other frame. If a match is found, matched feature points are tracked.

At a step S204, a check is made as to whether tracking is completed with respect to the entirety of the image sequence. If it is not, the procedure goes to a step S206.

At the step S206, a check is made as to whether all the selected feature points are successfully tracked between the two currently processed frames.

If tracking of any of the selected feature points fails, the procedure goes back to the step S200, where new feature points are selected and added to the already selected feature points. This selection is made by giving priority to those feature points which have higher ranks. Then, tracking is attempted again with respect to the new feature points at the step 202.

If it is found at the step S206 that tracking of all the selected feature points is successful, the procedure goes to the step S202, where the selected feature points are tracked between two successive frames, which are selected by advancing one frame from the two previously processed frames. In so doing, the selected feature points are identified in the earlier of the two successive frames, and tracking of these is attempted relative to the later of the two. In this manner, the predetermined number of feature points are successively tracked through successive pairs of two adjacent frames.

If it turns out at the step S204 that tracking of the predetermined number of feature points is successful through the entire image sequence, the procedure goes to a step S208, where a tracking matrix is generated by arranging coordinates of the tracked feature points in a matrix format.

At a step S210, the tracking matrix is stored in memory. This ends the procedure.

[Tracking-matrix Division Unit 1105]

Figure 16:
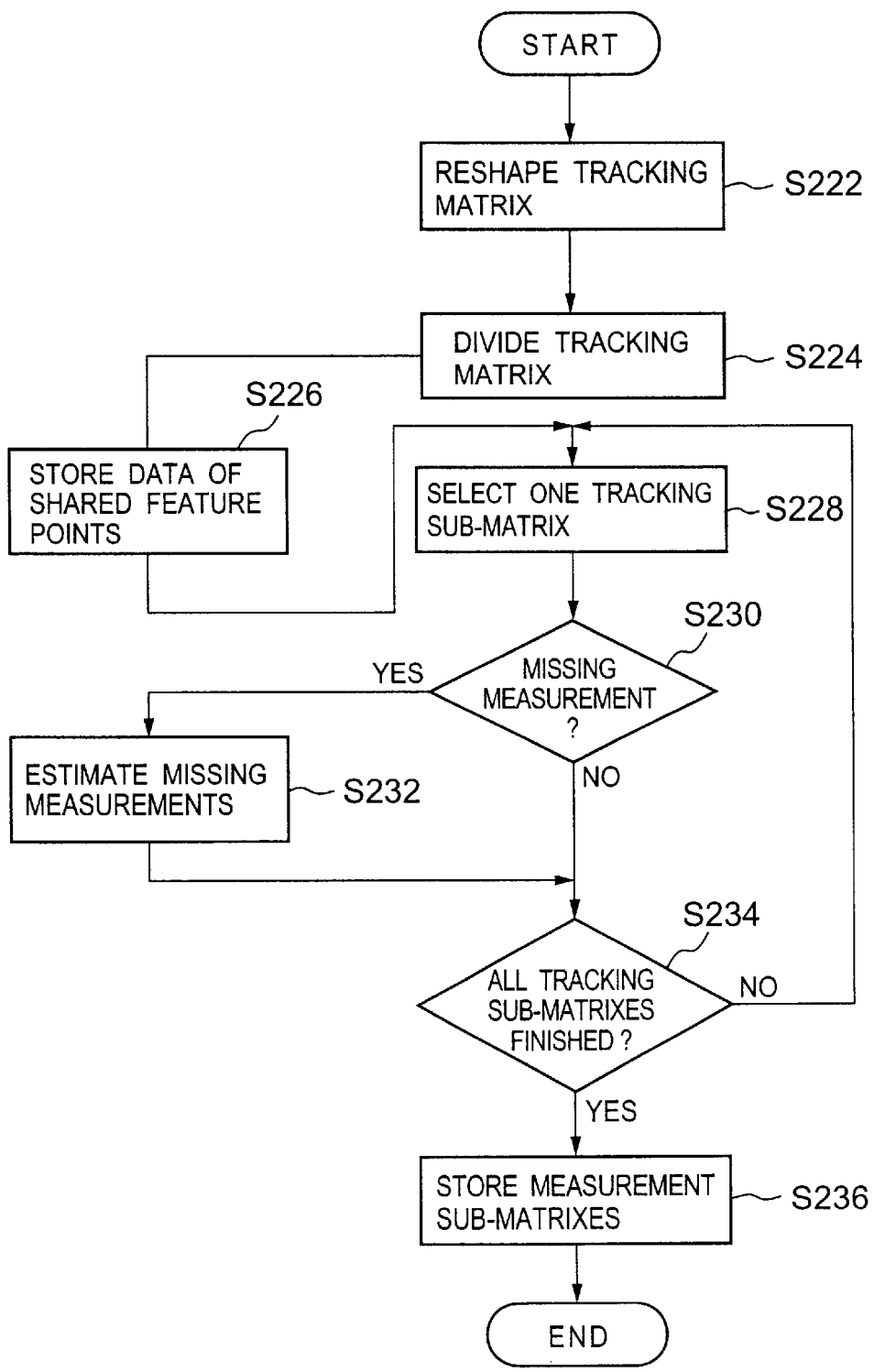
FIG. 16 is a flowchart of a process performed by a tracking-matrix division unit of FIG. 14.

FIG. 16 is a flowchart of a process performed by the tracking-matrix division unit 1105.

At a step S222, the tracking matrix is reshaped. Reshaping of the tracking matrix is desirable prior to division of the tracking matrix into a plurality of tracking sub-matrixes in order to make it easier to estimate missing measurements in these tracking sub-matrixes. In other words, the tracking matrix is reshaped in order to achieve easier and appropriate division of the tracking matrix. The reshaping process is exemplary performed as follows.

First, a time period (successive frames) during which tracking is continuously successful is taken into consideration in order to classify feature points into four groups as follows.

Figure 17:
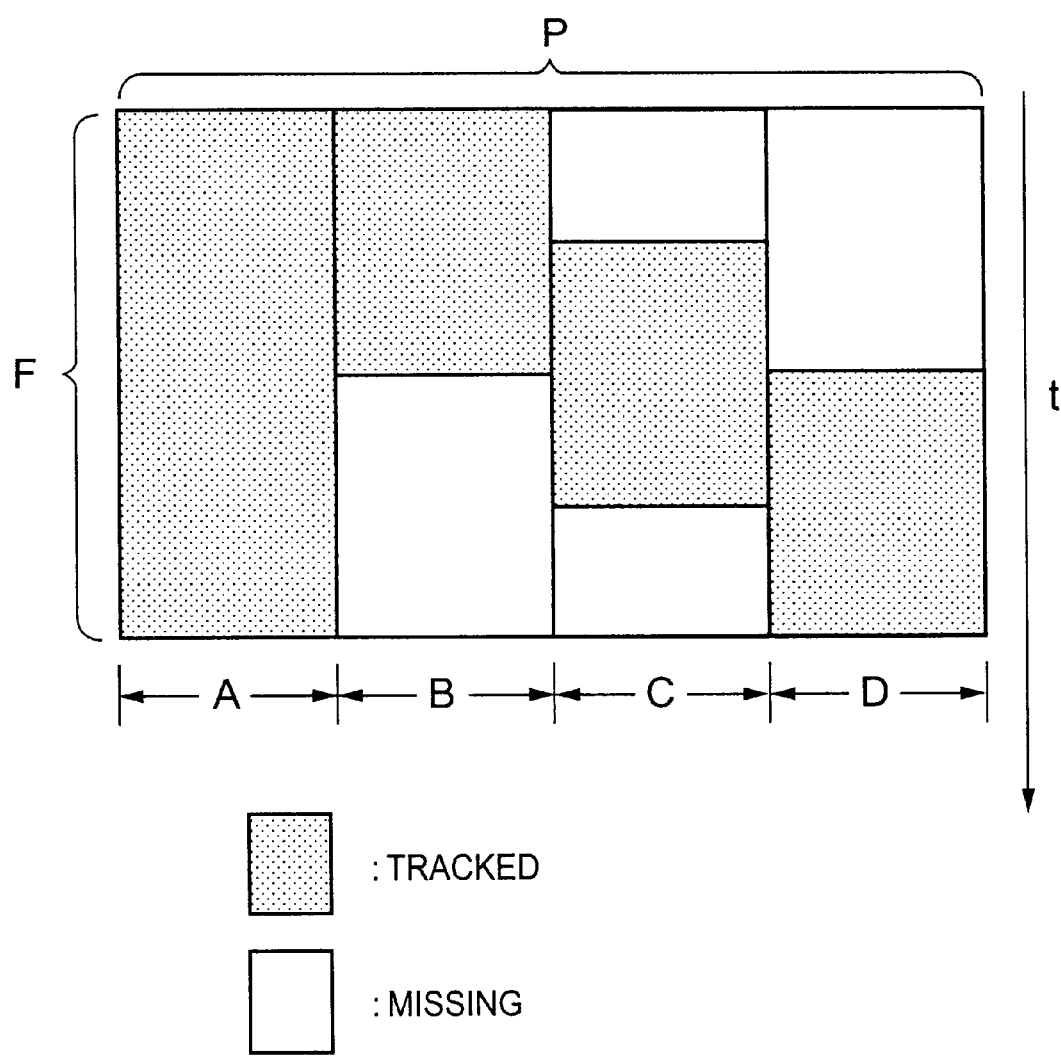
FIG. 17 is an illustrative drawing showing a tracking matrix obtained through reshaping processing which rearranges columns of the tracking matrix according to classification of feature points into four groups.

A Group: feature points for which tracking is successful from the first frame to the last frame B Group: feature points for which tracking is successful from the first frame but fails before it reaches the last frame C Group: feature points for which tracking starts succeeding only from halfway through the entire sequence and fails before it reaches the last frame D Group: feature points for which tracking is successful from halfway through the entire sequence until the last frame FIG. 17 is an illustrative drawing showing a tracking matrix obtained through the reshaping processing which rearranges columns of the tracking matrix according to the classification of feature points into the four groups.

In FIG. 17, hatched areas indicate portions of the matrix where coordinates of feature points are obtained, and blank areas indicate portions where no coordinates are obtained (i.e., there are missing measurements). Exactly stating, the upper half of the tracking matrix includes x coordinates of feature points present in successive frames of an image sequence, and the lower half includes y coordinates of these feature points. When P feature points and F frames are given, therefore, the tracking matrix has 2F rows and P columns. In FIG. 17, however, x coordinates and y coordinates are combined and shown as single matrix elements for the sake of simplicity of illustration. Hereinafter, illustration of a matrix in this format will be used when appropriate.

After the reshaping process, at a step S222, the tracking matrix is divided into a plurality of tracking sub-matrixes having an overlapping portion with each other.

Figure 18:
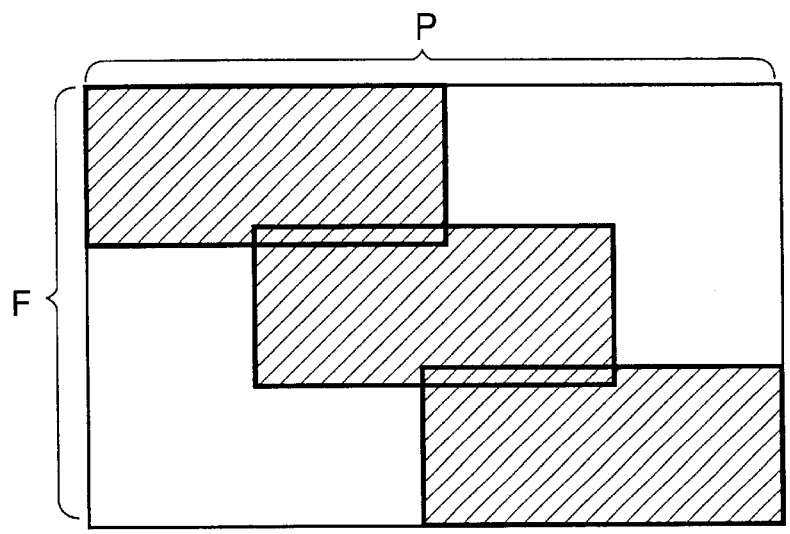
FIG. 18 is an illustrative drawing for explaining how to generate tracking sub-matrixes.

FIG. 18 is an illustrative drawing for explaining how to generate tracking sub-matrixes.

In FIG. 18, hatched regions define tracking sub-matrixes. As can be seen, these tracking sub-matrixes have overlapping portions therebetween.

The division process generally needs to satisfy the following requirements.

1) A given row of the tracking matrix must correspond to a row of at least one tracking sub-matrix, and a given column of the tracking matrix must correspond to a column of at least one tracking sub-matrix.

2) A size of each tracking sub-matrix must be larger than 6×4.

3) Between two tracking sub-matrixes, matrix data of at least one row and at least four columns must be shared as an overlapping portion.

4) In each tracking sub-matrix, more than four feature points are provided with complete tracking data, and complete tracking data must exist in more than three frames.

The requirement 1) is necessary for obtaining full data of feature points and full data of camera positions. The requirement 2) needs to be satisfied in order to perform the factorization method. The requirement 3) concerns integration of fragmentary data of feature points that are generated from tracking sub-matrixes, and guarantees that data shared between fragmentary data sets is sufficient in order to make successful integration. The requirement 4) is necessary in order to estimate missing measurements in each tracking sub-matrix.

Figure 19:
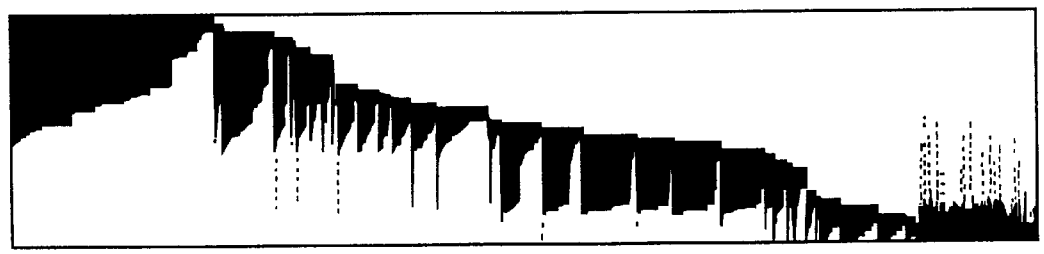
FIG. 19 is an illustrative drawing showing an example of a tracking matrix obtained after the reshaping process.

FIG. 19 is an illustrative drawing showing an example of a tracking matrix obtained after the reshaping process.

In FIG. 19, black portions indicate matrix elements provided with tracking data (coordinate data of feature points), and blank portions indicate matrix elements that lacks tracking data.

Figure 20:
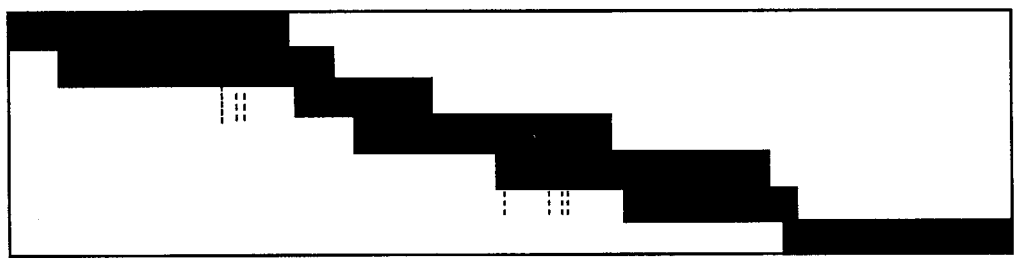
FIG. 20 is an illustrative drawing showing an example of tracking sub-matrixes that are defined with respect to the tracking matrix of FIG. 19.
Figure 21A:
FIGS. 21A through 21G are illustrative drawings showing the tracking sub-matrixes of FIG. 20 with regard to the tracked data contents thereof.
Figure 21B:
Figure 21C:
Figure 21D:
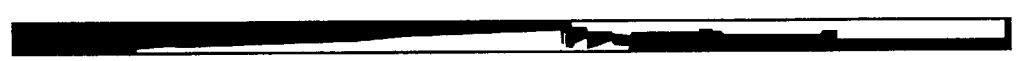
Figure 21E:
Figure 21F:
Figure 21G:

FIG. 20 is an illustrative drawing showing an example of tracking sub-matrixes that are defined with respect to the tracking matrix of FIG. 19.

As shown in FIG. 20, 7 tracking sub-matrixes are provided as shown by black rectangles. Here, overlapping portions between the tracking sub-matrixes are not shown for the sake of clarity.

FIGS. 21A through 21G are illustrative drawings showing the tracking sub-matrixes of FIG. 20 with regard to the tracked data contents thereof. FIGS. 21A through 21G corresponds to the tracking sub-matrixes of FIG. 20 in an order of arrangement from the top left to the bottom right.

When tracking sub-matrixes are generated through the division process as described above, at a step S226, data of feature points of the overlapping portions between the tracking sub-matrixes are stored in memory as data of shared feature points.

Thereafter, a process of estimating missing measurements is carried out with respect to each tracking sub-matrix.

At a step S228, one of the tracking sub-matrixes is selected. At a step S230, a check is made as to whether the selected tracking sub-matrix has any missing measurement. If no missing measurement is present, the procedure goes back to the step S228 to select a next one of the tracking sub-matrixes. If it is found at the step S230 that there is a missing measurement, the procedure proceeds to a step S232 to estimate the missing measurements.

The steps described above are repeated many times until a check at a step S234 finds that missing measurements are estimated in all the tracking sub-matrixes. Then, at a step S236, the tracking sub-matrixes having the missing measurements thereof estimated and the tracking sub-matrix having no missing measurements from the beginning are stored as measurement sub-matrixes.

In the following, the estimation of missing measurements at the step S232 will be described.

Figure 22:
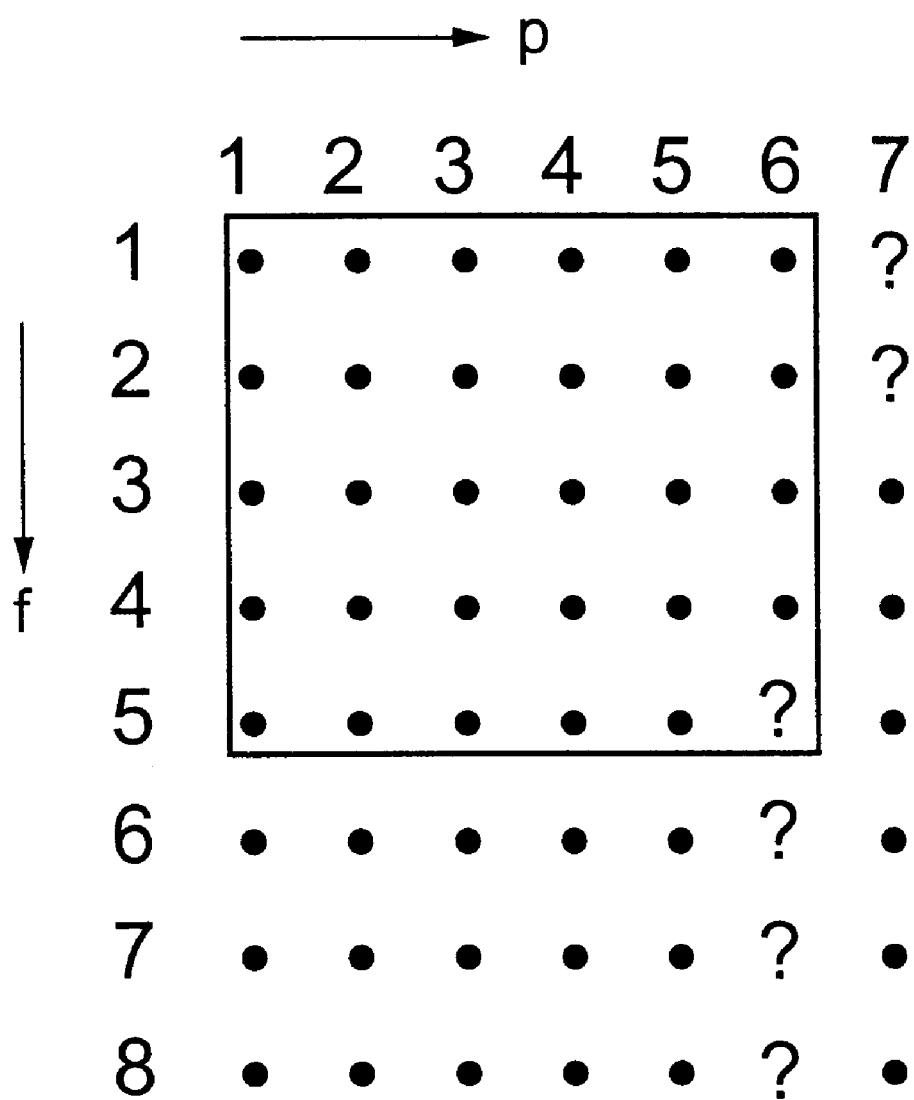
FIG. 22 is an illustrative drawing showing an example of a tracking matrix obtained by tracking 7 feature points through 8 frames.

FIG. 22 is an illustrative drawing showing an example of a tracking matrix obtained by tracking 7 feature points through 8 frames.

In the figure, the symbol "." indicates a successful tracking of a feature point, and, thus, a coordinate is available as a matrix element. The symbol "?" indicates a tracking failure, and, thus, a matrix element lacks a measurement. In order to estimate a missing measurement, known coordinates which surround a missing measurement are utilized.

First, a missing measurement to be estimated is selected. Then, a sub-matrix (estimation matrix) is defined such as to include the selected missing measurement. The estimation matrix must have only one missing measurement to be estimated, and all the other elements must be known (i.e., provided with a corresponding coordinate).

In FIG. 22, a missing measurement of the sixth feature point at the fifth frame is selected as a value to be estimated, for example. In this case, a sub-matrix as shown by a rectangle box is defined as an estimation matrix. By using this estimation matrix, the selected missing measurement is estimated. Then, the estimate is inserted into the matrix to fill in the selected missing measurement. Thereafter, a missing measurement of the sixth feature point at the sixth frame is selected as a value to be estimated, for example, and an estimation matrix is generated. This estimation matrix may be comprised of 6 columns corresponding to the first to sixth feature points and 6 rows corresponding to the first to sixth frames. An estimate of the missing measurement is then obtained, and is inserted into the matrix to fill in the missing measurement. Further, a missing measurement of the seventh feature point at the second frame is selected as a value to be estimated, for example, and an estimation matrix is generated by including columns corresponding to the first through seventh feature points and rows corresponding to the second through sixth frames. An estimate is then obtained based on this estimation matrix. In this manner, missing measurements (missing matrix elements) are successively estimated until all the missing measurements are interpolated.

Details of the estimation of missing measurements performed at the step S232 is basically the same as those of the process shown in FIG. 8. What is different from the process of FIG. 8 is that the estimation of missing measurements is conducted strictly within each tracking sub-matrix. In this embodiment, there is no need to estimate all the missing elements in the original tracking matrix. Namely, missing measurements which are not included in any tracking sub-matrix are not estimated. Without estimation of these missing measurements, 360° data of feature points will be obtained in this embodiment.

[3-Dimensional-fragmentary-data Generation Unit 1107]

Figure 23:
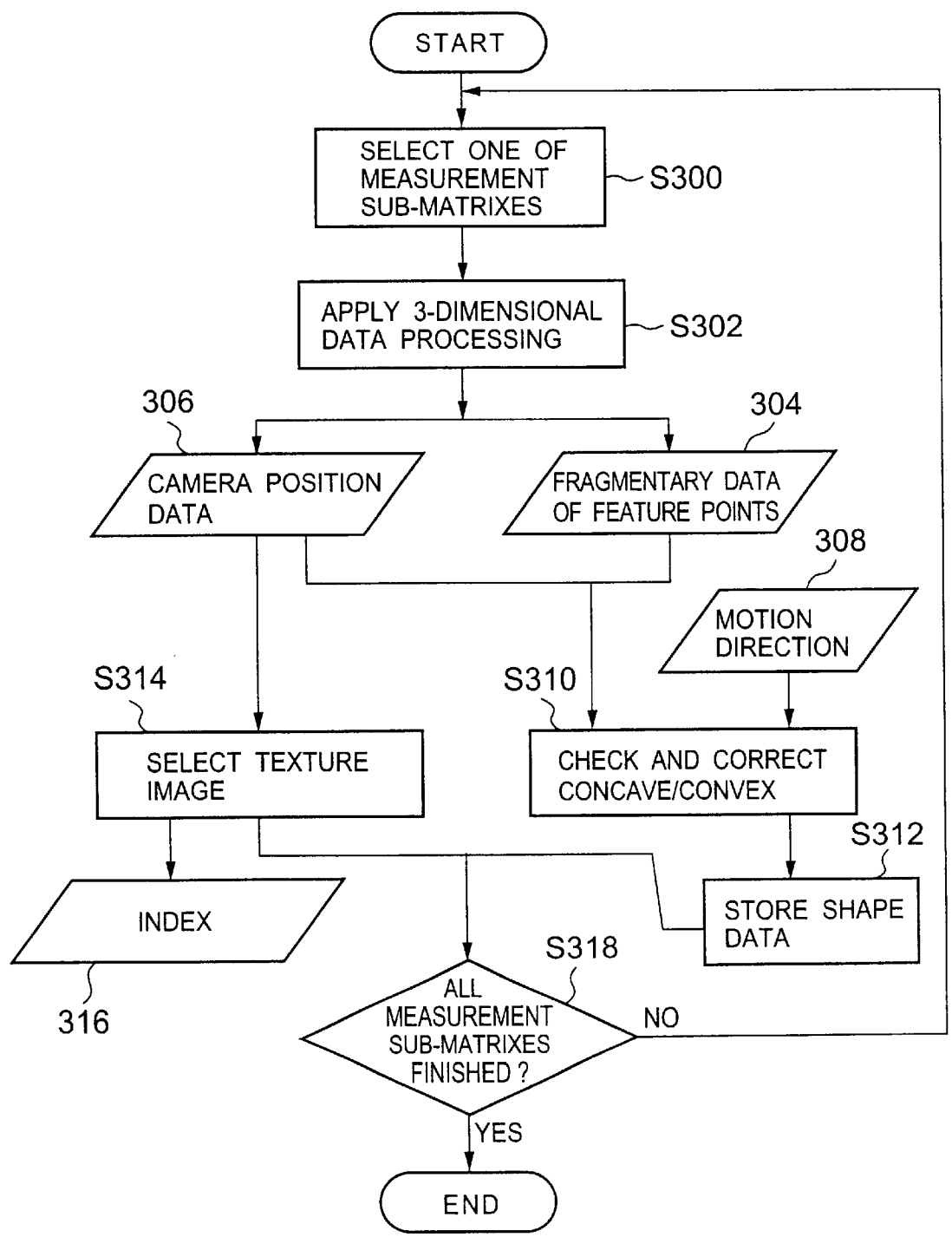
FIG. 23 is a flowchart of a process performed by a 3-dimensional-fragmentary-data generation unit of FIG. 14.

FIG. 23 is a flowchart of a process performed by the 3-dimensional-fragmentary-data generation unit 1107.

At a step S300, one of the measurement sub-matrix obtained after the estimation of missing measurements is selected.

At a step S302, 3-dimensional data processing based on the factorization method is applied to the measurement sub-matrix. As a result, fragmentary data of feature points 304 (representing a fragmentary shape of an object by 3-dimensional coordinates) is obtained, and, also, camera motion data (camera position data) 306 representing relative motion between the feature points and the camera is obtained.

Factorization does not have a unique solution, but has two solutions. This presents a problem that a distinction cannot be made as to whether an object surface is concave or convex.

At a step S310, therefore, the camera position data 306 is compared with a direction of actual relative motion 308 between the camera and the object, and a concave-convex-relation reversion operation is performed by rearranging z coordinates back in front with respect to the fragmentary data of feature points if the data does not show a match as a result of the comparison.

At a step S312, the shape data is stored.

At a step S314, an image is selected as a texture mapping image for use on meshes generated by the fragmentary data of feature points. The selection of an image is made based on the camera position data 306 such that the selected image corresponds to an camera optical axis that is closest to an average direction of all the vectors representing the fragmentary data of feature points 312. An index 316 of the texture mapping image is then stored.

At a step S318, a check is made as to whether there is a remaining measurement sub-matrix yet to be processed. If there is, another measurement sub-matrix is processed as described above. This process is repeated as many times as necessary until all the measurement sub-matrixes are processed.

[Fragmentary-feature-point-data Integration Unit 1108]

Figure 24:
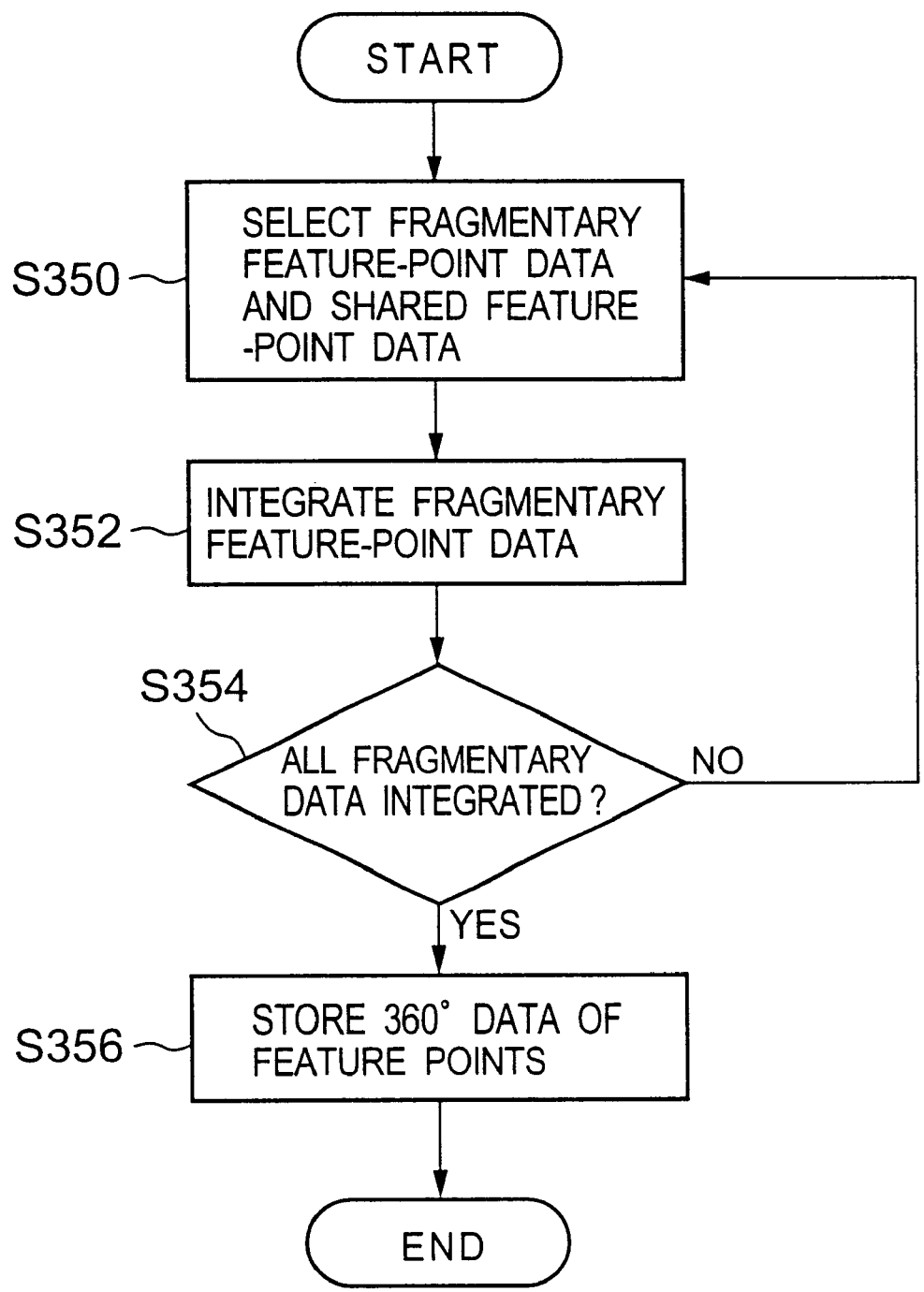
FIG. 24 is a flowchart of a process performed by a fragmentary-feature-point-data integration unit of FIG. 14.

FIG. 24 is a flowchart of a process performed by the fragmentary-feature-point-data integration unit 1108.

At a step S350, two sets of fragmentary feature-point data and corresponding shared feature-point data are selected with respect to two adjacent measurement sub-matrixes.

The fragmentary feature-point data referred to here is a representation of 3-dimensional coordinates. Such 3-dimensional feature-point data is hereinafter referred to as feature-point-cloud data (as in a cloud of feature points floating in the air) in order to distinguish it from 2-dimensional feature-point data.

At a step S352, the shared data of feature points is used as information that specifies correspondences between two sets of fragmentary feature-point-cloud data to integrate the two sets of fragmentary feature-point-cloud data through rotation, Affin transformation, etc. Then, the integrated data is added to all the fragmentary data of feature-point clouds integrated so far.

At a step S354, a check is made as to whether all sets of fragmentary feature-point-cloud data are integrated. If they are not, the procedure goes back to the step S350. Otherwise, the procedure goes to a step S356.

At the step S356, 360° data of a feature-point cloud representing an all-around view of an object shape is stored. This ends the procedure.

The 360° data of a feature-point cloud together with the indexes of texture mapping images are output via the data output unit 1109, and are stored in the memory unit 1110.

The series of procedures described above (or functions of the 3-dimensional-shape-information generation system) may be implemented as software running on a computer such as that shown in FIG. 12.

According to the embodiment described above, a computation time is significantly reduced compared with a case where the entirety of a tracking matrix is processed at once.

FIG. 25 is a table showing data of experiments highlighting significance of reductions in computation time.

In these experiments, Workstation ULTRA60 (CPU: UltraSPARC_II, memory: 384 MB) manufactured by SUN corporation was used, and the procedures as described above were implemented as software. The number of feature points was 1921. A tracking matrix was divided such that one fourth of all the feature points in each tracking sub-matrix were shared as shared feature-point data. A computation time shown in FIG. 25 is a CPU time that is calibrated as if 100% of the CPU time was dedicated. The number of tracking sub-matrixes is 1 when the factorization method is applied in a conventional manner without any division of the matrix.

The number of sub-matrix feature points indicates the number of feature points included in each tracking sub-matrix. Numbers shown in brackets are the numbers of shared feature points. Execution time indicates a computation time in seconds that was needed to generate fragmentary data of feature points from division of the tracking matrix. The execution time does not include a time period required for integrating fragmentary data of feature-point clouds, which is in an order of milliseconds, and is insignificant in comparison. Singular value decomposition indicates a computation time that was needed for singular value decomposition, and percentages shown alongside in brackets indicate a ratio of the computation time for singular value decomposition to the execution time described above. Most of the computation time of the factorization method was accounted for by the singular value decomposition.

As can be seen from FIG. 25, reductions in computation time are quite apparent. When the number of tracking sub-matrixes was 1 (i.e., conventional factorization), more than 2 hours of computation time were necessary. When the number of tracking sub-matrixes was 6, the computation time was reduced to 6 minutes. When the number of tracking sub-matrixes was 6, the computation time was further reduced by a significant amount, and only 90 seconds were required to generate 360° data of a feature-point cloud.

The embodiment described above makes it possible to reliably obtain data of feature points necessary for reconstructing a 3-dimensional object shape even when a tracking matrix includes missing measurements that are difficult to estimate if treating the tracking matrix as a whole. That is, this embodiment can generate 360° data of a feature-point cloud for reconstructing a 3-dimensional shape representing an all-around view of an object when an image sequence is taken from viewpoints all around the object. Further, this embodiment reduces a computation time involved in data generation for densely populated feature points, and reduces a memory size required for such a computation. Further, an object shape can be reconstructed without confusion between concave surfaces and convex surfaces. Moreover, texture-mapping images for use on meshes generated by the feature-point cloud data are automatically selected from the image sequence.

Further, the present invention is not limited to these embodiments, but various variations and modifications maybe made without departing from the scope of the present invention.

The present application is based on Japanese priority applications No. 10-287876 filed on Oct. 9, 1998, and No. 11-041321 filed on Feb. 19, 1999, with the Japanese Patent Office, the entire contents of which are hereby incorporated by reference.

What is claimed is:

1. A method of obtaining a 3-dimensional shape of an object from a sequence of image frames, comprising the steps of:

a) generating a tracking matrix which has matrix elements representing coordinates of feature points of the object tracked through the sequence, and has each row representing a corresponding image frame and each column representing a corresponding feature point, wherein some of the matrix elements are missing;

b) generating an estimation matrix as a sub-matrix of the tracking matrix by selecting rows and by selecting a column of a given feature point and columns of a predetermined number of feature points closest to the given feature point, such that the estimation matrix has matrix elements thereof missing only for the given feature point in a single image frame;

c) calculating estimates of the missing matrix elements of the estimation matrix;

d) repeating said steps b) and c) to obtain estimates of remaining missing matrix elements of the tracking matrix; and e) obtaining a 3-dimensional shape of the object from the tracking matrix having the missing matrix elements thereof estimated.

2. The method as claimed in claim 1, wherein said step b) includes a step of comparing the coordinates of the given feature point with the coordinates of the feature points in an image frame immediately preceding said single image frame, so as to select said feature points closest to the given feature point.

3. The method as claimed in claim 1, wherein said step c) includes repeating estimation of the missing matrix elements of the estimation matrix until the estimation is successful while size of the estimation matrix is increased at each attempt of the estimation of the missing matrix elements of the estimation matrix.

4. The method as claimed in claim 1, wherein said step b) further includes a step of reshaping the tracking matrix by rearranging columns of the tracking matrix according to classification of the feature points into groups based on how the feature points are tracked through the sequence, said step of reshaping being performed prior to the generation of the estimation matrix.

5. The method as claimed in claim 4, wherein said step b) further includes a step of turning the tracking matrix upside down when the estimation matrix cannot be generated despite presence of still remaining missing matrix elements in the tracking matrix.

6. The method as claimed in claim 1, further comprising the steps of:

generating the sequence of image frames by taking pictures of the object while the object rotates relative to a camera view;

obtaining motion of the feature points from the tracking matrix having the missing matrix elements thereof estimated; and reversing a convex surface to a concave surface or reversing a concave surface to a convex surface with regard to said 3-dimensional shape of the object if the motion of the feature points is in a direction opposite to a rotational direction of the object.

7. A device for obtaining a 3-dimensional shape of an object from a sequence of image frames, comprising:

a tracking-matrix-generation unit which generates a tracking matrix that has matrix elements representing coordinates of feature points of the object tracked through the sequence, and that has each row representing a corresponding image frame and each column representing a corresponding feature point, wherein some of the matrix elements are missing;

an estimation-matrix-generation unit which generates an estimation matrix as a sub-matrix of the tracking matrix by selecting rows and by selecting a column of a given feature point and columns of a predetermined number of feature points closest to the given feature point, such that the estimation matrix has matrix elements thereof missing only for the given feature point in a single image frame;

a missing-matrix-element-estimation unit which calculates estimates of the missing matrix elements of the estimation matrix, and further obtain estimates of remaining missing matrix elements of the tracking matrix based on estimation matrixes generated by said estimation-matrix-generation unit; and a 3-dimensional-data operation unit which obtains a 3-dimensional shape of the object from the tracking matrix having the missing matrix elements thereof estimated.

8. The device as claimed in claim 7, wherein said estimation-matrix-generation unit compares the coordinates of the given feature point with the coordinates of the feature points in an image frame immediately preceding said single image frame, so as to select said feature points closest to the given feature point.

9. The device as claimed in claim 7, wherein repeats estimation of the missing matrix elements of the estimation matrix until the estimation is successful while said estimation-matrix-generation unit increases size of the estimation matrix at each attempt of the estimation of the missing matrix elements of the estimation matrix.

10. The device as claimed in claim 7, wherein said estimation-matrix-generation unit reshapes the tracking matrix by rearranging columns of the tracking matrix according to classification of the feature points into groups based on how the feature points are tracked through the sequence, and generates the estimation matrix as a sub-matrix of the reshaped tracking matrix.

11. The device as claimed in claim 10, wherein said estimation-matrix-generation unit turns the tracking matrix upside down when the estimation matrix cannot be generated despite presence of still remaining missing matrix elements in the tracking matrix.

12. The device as claimed in claim 7, further comprising a unit which generates the sequence of image frames by taking pictures of the object while the object rotates relative to a camera view, wherein said 3-dimensional-data operation unit obtains motion of the feature points from the tracking matrix having the missing matrix elements thereof estimated, and reverses a convex surface to a concave surface or reversing a concave surface to a convex surface with regard to said 3-dimensional shape of the object if the motion of the feature points is in a direction opposite to a rotational direction of the object.

13. A computer-readable medium having a program embodied therein for causing a computer to obtain a 3-dimensional shape of an object from a sequence of image frames, said program comprising:

a tracking-matrix-generation unit which generates a tracking matrix that has matrix elements representing coordinates of feature points of the object tracked through the sequence, and that has each row representing a corresponding image frame and each column representing a corresponding feature point, wherein some of the matrix elements are missing;

an estimation-matrix-generation unit which generates an estimation matrix as a sub-matrix of the tracking matrix by selecting rows and by selecting a column of a given feature point and columns of a predetermined number of feature points closest to the given feature point, such that the estimation matrix has matrix elements thereof missing only for the given feature point in a single image frame;

a missing-matrix-element-estimation unit which calculates estimates of the missing matrix elements of the estimation matrix, and further obtain estimates of remaining missing matrix elements of the tracking matrix based on estimation matrixes generated by said estimation-matrix-generation unit; and a 3-dimensional-data operation unit which obtains a 3-dimensional shape of the object from the tracking matrix having the missing matrix elements thereof estimated.

14. The computer-readable medium as claimed in claim 13, wherein said estimation-matrix-generation unit compares the coordinates of the given feature point with the coordinates of the feature points in an image frame immediately preceding said single image frame, so as to select said feature points closest to the given feature point.

15. The computer-readable medium as claimed in claim 13, wherein said missing-matrix-element-estimation unit repeats estimation of the missing matrix elements of the estimation matrix until the estimation is successful while said estimation-matrix-generation unit increases size of the estimation matrix at each attempt of the estimation of the missing matrix elements of the estimation matrix.

16. The computer-readable medium as claimed in claim 13, wherein said estimation-matrix-generation unit reshapes the tracking matrix by rearranging columns of the tracking matrix according to classification of the feature points into groups based on how the feature points are tracked through the sequence, and generates the estimation matrix as a sub-matrix of the reshaped tracking matrix.

17. The computer-readable medium as claimed in claim 16, wherein said estimation-matrix-generation unit turns the tracking matrix upside down when the estimation matrix cannot be generated despite presence of still remaining missing matrix elements in the tracking matrix.

18. The computer-readable medium as claimed in claim 13, wherein said program further includes a unit which generates the sequence of image frames by taking pictures of the object while the object rotates relative to a camera view, and wherein said 3-dimensional-data operation unit obtains motion of the feature points from the tracking matrix having the missing matrix elements thereof estimated, and reverses a convex surface to a concave surface or reversing a concave surface to a convex surface with regard to said 3-dimensional shape of the object if the motion of the feature points is in a direction opposite to a rotational direction of the object.

19. A computer-readable medium having a program embodied therein for causing a computer to estimate missing matrix elements of a tracking matrix that has matrix elements representing coordinates of feature points of an object tracked through a sequence of image frames, and that has each row representing a corresponding image frame and each column representing a corresponding feature point, said program comprising an estimation-matrix-generation unit which generates an estimation matrix as a sub-matrix of the tracking matrix by selecting rows and by selecting a column of a given feature point and columns of a predetermined number of feature points closest to the given feature point, such that the estimation matrix has matrix elements thereof missing only for the given feature point in a single image frame; and a missing-matrix-element-estimation unit which calculates estimates of the missing matrix elements of the estimation matrix, and further obtain estimates of remaining missing matrix elements of the tracking matrix based on estimation matrixes generated by said estimation-matrix-generation unit.

20. The computer-readable medium as claimed in claim 19, wherein said estimation-matrix-generation unit compares the coordinates of the given feature point with the coordinates of the feature points in an image frame immediately preceding said single image frame, so as to select said feature points closest to the given feature point.

21. A method of obtaining a 3-dimensional shape of an object, comprising the steps of:

generating a tracking matrix by tracking feature points through a sequence of images of the object, wherein the tracking matrix has some of matrix elements thereof missing;

extracting sub-matrixes from the tracking matrix to generate a plurality of tracking sub-matrixes having an overlapping portion with each other;

estimating the missing matrix elements in each of the tracking sub-matrixes to generate a plurality of measurement sub-matrixes substantially devoid of the missing matrix elements;

generating coordinate data of the feature points from each of the measurement sub-matrixes; and integrating the coordinate data of the feature points over all the measurement sub-matrixes.

22. The method as claimed in claim 21, wherein said step of generating coordinate data of the feature points includes the steps of:

obtaining motion of the feature points and coordinates of the feature points from each of the measurement sub-matrixes; and reversing a convex surface to a concave surface or reversing a concave surface to a convex surface with regard to a surface shape represented by said coordinates of the feature points if the motion of the feature points is in a direction opposite to a rotational direction of the object, so as to generate said coordinate data of the feature points.

23. The method as claimed in claim 21, further comprising the steps of:

obtaining data of camera positions from a given one of the measurement sub-matrixes;

selecting a texture-mapping image from one of the images that is selected based on the data of camera positions, the texture-mapping image being used for a surface represented by the coordinate data of the feature points obtained from the given one of the measurement sub-matrixes.

24. The method as claimed in claim 21, wherein said step of integrating the coordinate data of the feature points connects the coordinate data of the feature points between the measurement sub-matrixes by finding a match therebetween in said overlapping portion.

25. A computer-readable medium having a program embodied therein for causing a computer to obtain a 3-dimensional shape of an object, said program comprising:

a code unit configured to generate a tracking matrix by tracking feature points through a sequence of images of the object, wherein the tracking matrix has some of matrix elements thereof missing;

a code unit configured to extract sub-matrixes from the tracking matrix to generate a plurality of tracking sub-matrixes having an overlapping portion with each other;

a code unit configured to estimate the missing matrix elements in each of the tracking sub-matrixes to generate a plurality of measurement sub-matrixes substantially devoid of the missing matrix elements;

a code unit configured to generate coordinate data of the feature points from each of the measurement sub-matrixes; and a code unit configured to integrate the coordinate data of the feature points over all the measurement sub-matrixes.

26. The computer-readable medium as claimed in claim 25, wherein said code unit configured to generate coordinate data of the feature points includes:

a code unit configured to obtain motion of the feature points and coordinates of the feature points from each of the measurement sub-matrixes; and a code unit configured to reverse a convex surface to a concave surface or reverse a concave surface to a convex surface with regard to a surface shape represented by said coordinates of the feature points if the motion of the feature points is in a direction opposite to a rotational direction of the object, so as to generate said coordinate data of the feature points.

27. The computer-readable medium as claimed in claim 25, further comprising:

a code unit configured to obtain data of camera positions from a given one of the measurement sub-matrixes;

a code unit configured to select a texture-mapping image from one of the images that is selected based on the data of camera positions, the texture-mapping image being used for a surface represented by the coordinate data of the feature points obtained from the given one of the measurement sub-matrixes.

28. The computer-readable medium as claimed in claim 25, wherein said code unit configured to integrate the coordinate data of the feature points connects the coordinate data of the feature points between the measurement sub-matrixes by finding a match therebetween in said overlapping portion.

29. A device for obtaining a 3-dimensional shape of an object, comprising:

a tracking-matrix-generation unit which generates a tracking matrix by tracking feature points through a sequence of images of the object, wherein the tracking matrix has some of matrix elements thereof missing;

a tracking-matrix-division unit which extracts sub-matrixes from the tracking matrix to generate a plurality of tracking sub-matrixes having an overlapping portion with each other, and estimates the missing matrix elements in each of the tracking sub-matrixes to generate a plurality of measurement sub-matrixes substantially devoid of the missing matrix elements;

a 3-dimensional-fragmentary-data-generation unit which generates coordinate data of the feature points from each of the measurement sub-matrixes; and a fragmentary-feature-point-data-integration unit which integrates the coordinate data of the feature points over all the measurement sub-matrixes.

30. The device as claimed in claim 29, wherein said 3-dimensional-fragmentary-data-generation unit obtains motion of the feature points and coordinates of the feature points from each of the measurement sub-matrixes, and reverses a convex surface to a concave surface or reverse a concave surface to a convex surface with regard to a surface shape represented by said coordinates of the feature points if the motion of the feature points is in a direction opposite to a rotational direction of the object, so as to generate said coordinate data of the feature points.

31. The device as claimed in claim 29, wherein said 3-dimensional-fragmentary-data-generation unit further obtains data of camera positions from a given one of the measurement sub-matrixes, and selects a texture-mapping image from one of the images that is selected based on the data of camera positions, the texture-mapping image being used for a surface represented by the coordinate data of the feature points obtained from the given one of the measurement sub-matrixes.

32. The device as claimed in claim 29, wherein said fragmentary-feature-point-data-integration unit connects the coordinate data of the feature points between the measurement sub-matrixes by finding a match therebetween in said overlapping portion.

* * * * *